(12) United States Patent
Sprenger et al.

(10) Patent No.: US 10,516,914 B2
(45) Date of Patent: Dec. 24, 2019

(54) METHOD AND SYSTEM FOR IMPLEMENTING AUTOMATIC AUDIO OPTIMIZATION FOR STREAMING SERVICES

(71) Applicant: CenturyLink Intellectual Property LLC, Denver, CO (US)

(72) Inventors: Michael D. Sprenger, Boulder, CO (US); Zubin Ingah, Centennial, CO (US)

(73) Assignee: CenturyLink Intellectual Property LLC, Broomfield, CO (US)

(*) Notice: Subject to any disclaimer, the term of this patent is extended or adjusted under 35 U.S.C. 154(b) by 0 days.

(21) Appl. No.: 15/785,014

(22) Filed: Oct. 16, 2017

(65) Prior Publication Data

US 2018/0109837 A1    Apr. 19, 2018

Related U.S. Application Data

(60) Provisional application No. 62/410,269, filed on Oct. 19, 2016.

(51) Int. Cl.
*H04N 7/173* (2011.01)
*H04N 21/439* (2011.01)
(Continued)

(52) U.S. Cl.
CPC ........ *H04N 21/439* (2013.01); *G06F 16/686* (2019.01); *H04N 21/432* (2013.01); *H04N 21/4318* (2013.01); *H04N 21/47202* (2013.01); *H04N 21/47217* (2013.01); *H04N 21/4852* (2013.01); *H04N 21/8106* (2013.01); *H04N 21/64322* (2013.01)

(58) Field of Classification Search
CPC ............ H04N 21/439; H04N 21/4852; H04N 21/47217; H04N 21/432; H04N 21/47202; H04N 21/64322
USPC ........................................................... 725/98
See application file for complete search history.

(56) References Cited

U.S. PATENT DOCUMENTS 5,852,438 A    12/1998 Tomizawa
6,032,156 A    2/2000 Marcus
(Continued)

*Primary Examiner* — Pankaj Kumar
*Assistant Examiner* — Sahar Aqil Riaz

(57) ABSTRACT

Novel tools and techniques are provided for implementing media content streaming or playback, and, in particular, automatic audio optimization. In some embodiments, a computing system might receive user input indicating a request for presentation of media content, initiate database lookup in a database for audio parameter settings associated with the requested media content, and determine whether the database contains audio parameter settings specifically associated with the requested media content. If so, the computing system retrieves the audio parameter settings and automatically reconfigures an audio playback device(s) with the retrieved audio parameter settings. If not, the computing system determines whether the database contains audio parameter settings associated with a content category to which the requested media content belongs. If so, such audio parameter settings are retrieved and the audio playback device(s) are reconfigured with the audio parameter settings. If not, the audio playback device(s) are reconfigured with default audio parameter settings.

22 Claims, 14 Drawing Sheets

(51) Int. Cl.
*H04N 21/485* (2011.01)
*H04N 21/472* (2011.01)
*H04N 21/432* (2011.01)
*G06F 16/68* (2019.01)
*H04N 21/431* (2011.01)
*H04N 21/81* (2011.01)
*H04N 21/643* (2011.01)

(56) References Cited

U.S. PATENT DOCUMENTS

| | | | | |
|---|---|---|---|---|
| 6,263,502 B1 * | 7/2001 | Morrison | | H04N 5/44 |
| | | | | 348/563 |
| 8,482,614 B2 * | 7/2013 | Dean | | G11B 27/10 |
| | | | | 348/177 |
| 8,849,434 B1 * | 9/2014 | Pontual | | H04N 21/4394 |
| | | | | 700/94 |
| 9,071,867 B1 | 6/2015 | Ray | | |
| 9,445,036 B2 * | 9/2016 | Hamano | | H04H 60/46 |
| 9,620,169 B1 | 4/2017 | Nolan | | |
| 9,838,731 B1 | 12/2017 | Matias | | |
| 2003/0059198 A1 | 3/2003 | Yagura | | |
| 2004/0107442 A1 * | 6/2004 | Bayley | | H03G 1/02 |
| | | | | 725/93 |
| 2004/0123327 A1 * | 6/2004 | Fai Ma | | H04N 5/44513 |
| | | | | 725/100 |
| 2007/0011196 A1 * | 1/2007 | Ball | | H04H 60/45 |
| 2007/0209047 A1 * | 9/2007 | Hallberg | | H04N 7/17318 |
| | | | | 725/9 |
| 2011/0019102 A1 * | 1/2011 | Katsuya | | G11B 27/002 |
| | | | | 348/725 |
| 2014/0092304 A1 | 4/2014 | Chen | | |
| 2014/0241213 A1 | 8/2014 | Gumaer | | |
| 2014/0288686 A1 | 9/2014 | Sant | | |
| 2014/0310599 A1 | 10/2014 | Clift | | |
| 2014/0355789 A1 * | 12/2014 | Bohrarper | | H04R 3/00 |
| | | | | 381/119 |
| 2015/0058732 A1 | 2/2015 | Nakamura | | |
| 2015/0074599 A1 | 3/2015 | Stein | | |
| 2015/0098590 A1 * | 4/2015 | Oswell | | H04R 3/04 |
| | | | | 381/120 |
| 2015/0135134 A1 | 5/2015 | Circlaeys | | |
| 2015/0150044 A1 * | 5/2015 | Jiang | | H04N 21/23424 |
| | | | | 725/32 |
| 2015/0256891 A1 * | 9/2015 | Kim | | H04N 5/602 |
| | | | | 725/39 |
| 2015/0363060 A1 | 12/2015 | Gaunt | | |
| 2016/0173931 A1 * | 6/2016 | Eber | | H04N 21/242 |
| | | | | 725/38 |
| 2017/0300289 A1 * | 10/2017 | Gattis | | G10L 19/018 |
| 2018/0095656 A1 | 4/2018 | Ingah et al. | | |
| 2018/0176639 A1 | 6/2018 | Sprenger et al. | | |

* cited by examiner

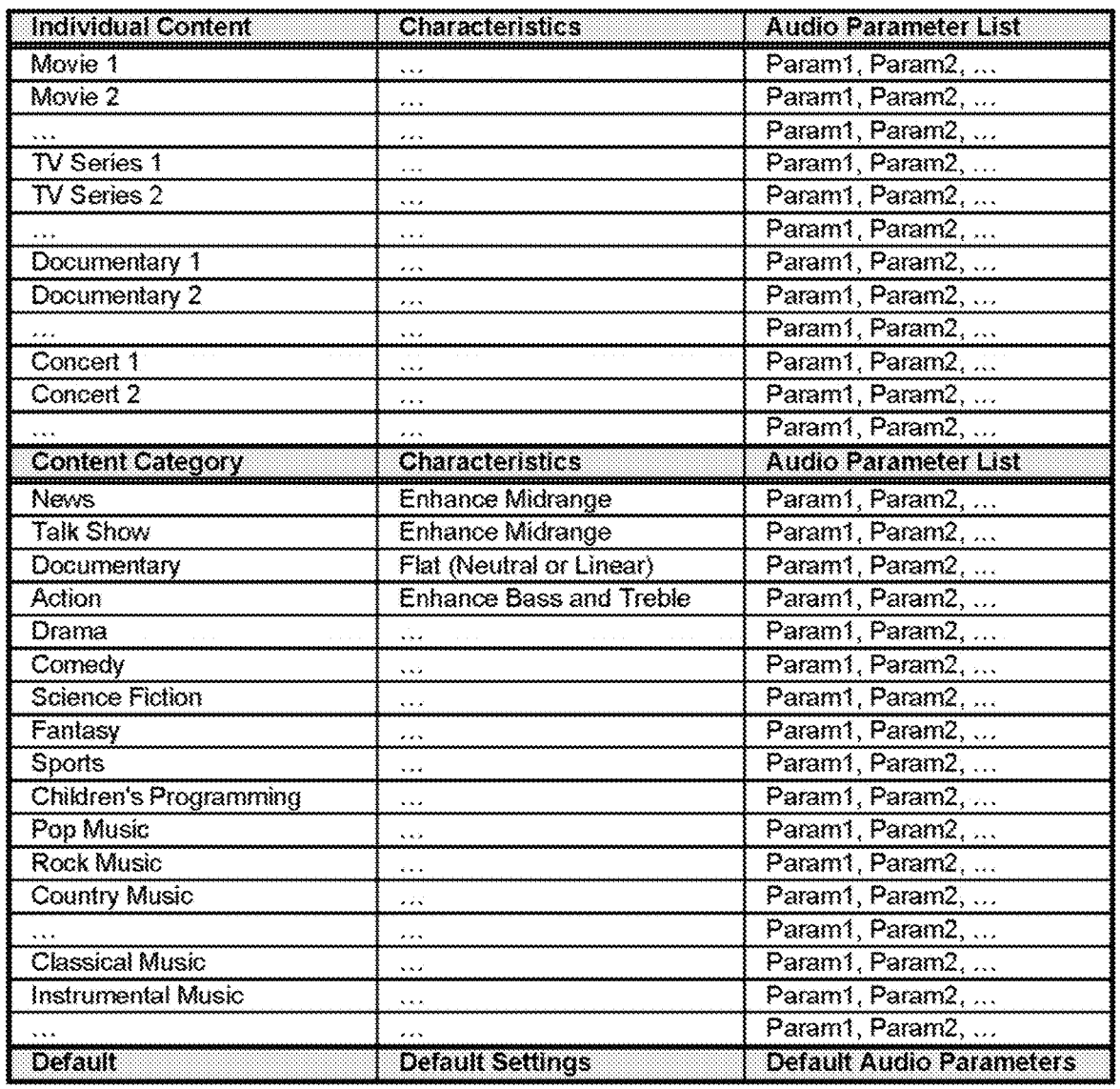

| Individual Content | Characteristics | Audio Parameter List |
|---|---|---|
| Movie 1 | ... | Param1, Param2, ... |
| Movie 2 | ... | Param1, Param2, ... |
| ... | ... | Param1, Param2, ... |
| TV Series 1 | ... | Param1, Param2, ... |
| TV Series 2 | ... | Param1, Param2, ... |
| ... | ... | Param1, Param2, ... |
| Documentary 1 | ... | Param1, Param2, ... |
| Documentary 2 | ... | Param1, Param2, ... |
| ... | ... | Param1, Param2, ... |
| Concert 1 | ... | Param1, Param2, ... |
| Concert 2 | ... | Param1, Param2, ... |
| ... | ... | Param1, Param2, ... |
| Content Category | Characteristics | Audio Parameter List |
| News | Enhance Midrange | Param1, Param2, ... |
| Talk Show | Enhance Midrange | Param1, Param2, ... |
| Documentary | Flat (Neutral or Linear) | Param1, Param2, ... |
| Action | Enhance Bass and Treble | Param1, Param2, ... |
| Drama | ... | Param1, Param2, ... |
| Comedy | ... | Param1, Param2, ... |
| Science Fiction | ... | Param1, Param2, ... |
| Fantasy | ... | Param1, Param2, ... |
| Sports | ... | Param1, Param2, ... |
| Children's Programming | ... | Param1, Param2, ... |
| Pop Music | ... | Param1, Param2, ... |
| Rock Music | ... | Param1, Param2, ... |
| Country Music | ... | Param1, Param2, ... |
| ... | ... | Param1, Param2, ... |
| Classical Music | ... | Param1, Param2, ... |
| Instrumental Music | ... | Param1, Param2, ... |
| ... | ... | Param1, Param2, ... |
| Default | Default Settings | Default Audio Parameters |

Fig. 4A

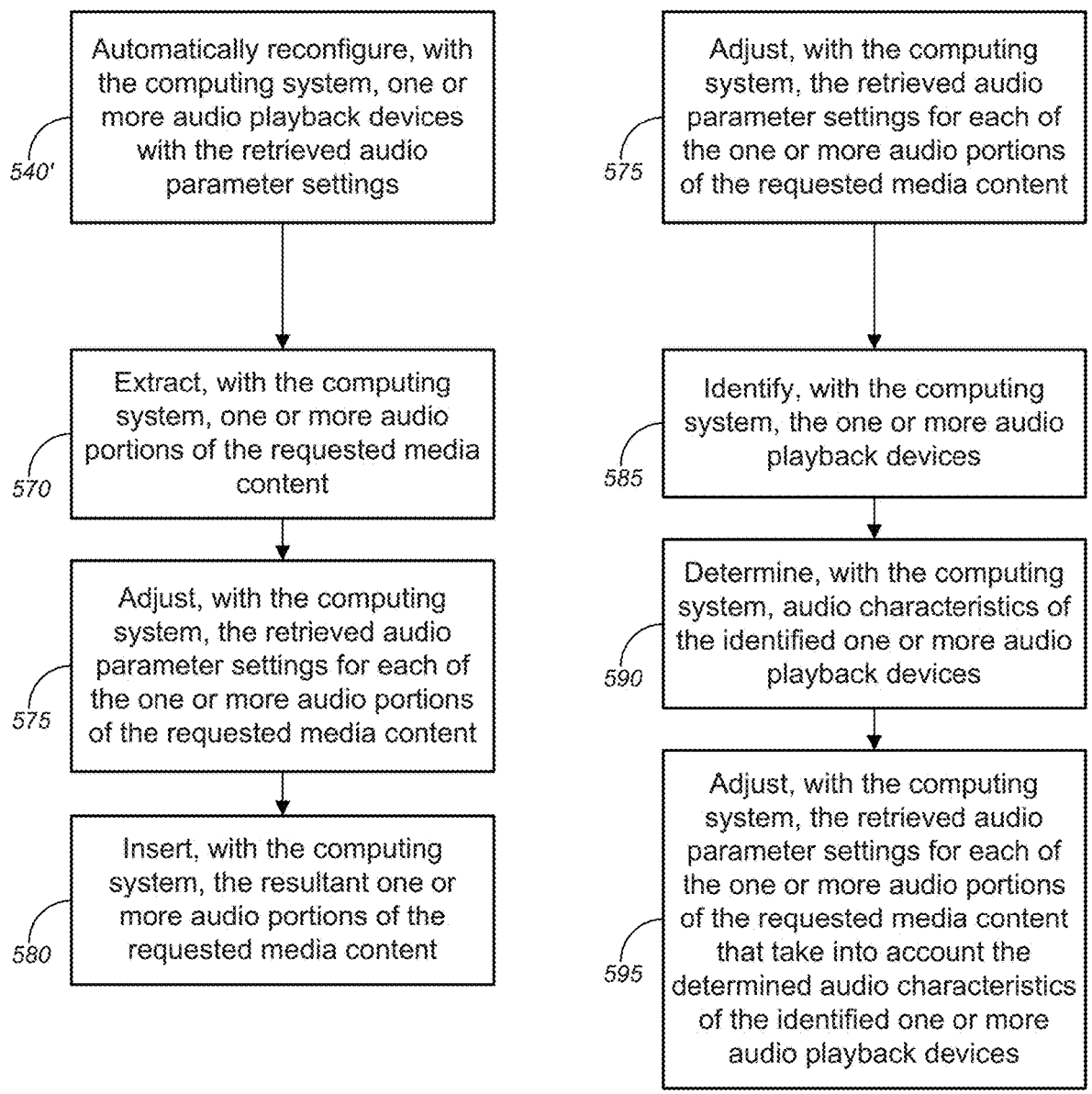

METHOD AND SYSTEM FOR IMPLEMENTING AUTOMATIC AUDIO OPTIMIZATION FOR STREAMING SERVICES

CROSS-REFERENCES TO RELATED APPLICATIONS

This application claims priority to U.S. Patent Application Ser. No. 62/410,269 (the "'269 Application"), filed Oct. 19, 2016 by Michael D. Sprenger et al., entitled, "Automatic Audio Optimization for Streaming Services," the disclosure of which is incorporated herein by reference in its entirety for all purposes.

This application may be related to U.S. patent application Ser. No. 15/477,376 (the "'376 Application"), filed on Apr. 3, 2017 by Zubin Ingah et al., entitled, "Method and System for Implementing Content Navigation or Selection Using Touch-Based Input," which claims priority to U.S. Patent Application Ser. No. 62/403,843 (the "'843 Application"), filed Oct. 4, 2016 by Zubin Ingah et al., entitled, "Novel Mechanism for Content Selection Using Touchscreen or Touchpad," the disclosures of both of which are incorporated herein by reference in their entirety for all purposes. This application may also be related to U.S. patent application Ser. No. 15/477,812 (the "'812 Application"), filed on Apr. 3, 2017 by Michael D. Sprenger et al., entitled, "Method and System for Implementing Advanced Audio Shifting," which claims priority to U.S. Patent Application Ser. No. 62/435,992 (the "'992 Application"), filed Dec. 19, 2016 by Michael D. Sprenger et al., entitled, "Advanced Audio Fading Mechanism," the disclosures of both of which are incorporated herein by reference in their entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing media content streaming or playback, and, more particularly, to methods, systems, and apparatuses for implementing automatic audio optimization (in some cases, for streaming services or the like).

BACKGROUND

Conventional audio optimization systems today are controllable at the user's end. Some conventional audio optimization systems enable the adjustment of audio parameters to room characteristics. This is typically achieved via a set of defined test signals that are output through loudspeakers, received via one or more microphones, then analyzed and processed to compensate for certain deficiencies of the room where the audio system is set up. Such compensation can alleviate room characteristics such as reflections or excessive attenuation or boosting of certain frequencies to some extent. Other existing conventional audio optimization systems enable users to select among a set of pre-defined audio parameter profiles. Examples of such audio profiles include, but are not limited to, "Concert Hall," "Cathedral," "Jazz Club," "Rock Arena," and/or the like. These typically adjust frequency response and/or add effects such as reverb to emulate the typical sound encountered in certain types of music venues. In these cases, the adjustment of audio parameter or selection of audio profile is static and performed manually by the user, based on listening preferences. The inventors are not aware of an automated system that provides automatic parameter setting capabilities based on individual content or content category.

Hence, there is a need for more robust and scalable solutions for implementing media content streaming or playback, and, more particularly, to methods, systems, and apparatuses for implementing automatic audio optimization (in some cases, for streaming services, or the like).

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 4A is a diagram illustrating an exemplary lookup table that may be used for implementing automatic audio optimization, in accordance with various embodiments.

FIGS. 5A-5D are flow diagrams illustrating a method for implementing automatic audio optimization, in accordance with various embodiments.

DETAILED DESCRIPTION OF CERTAIN EMBODIMENTS

Overview

Figure 1:
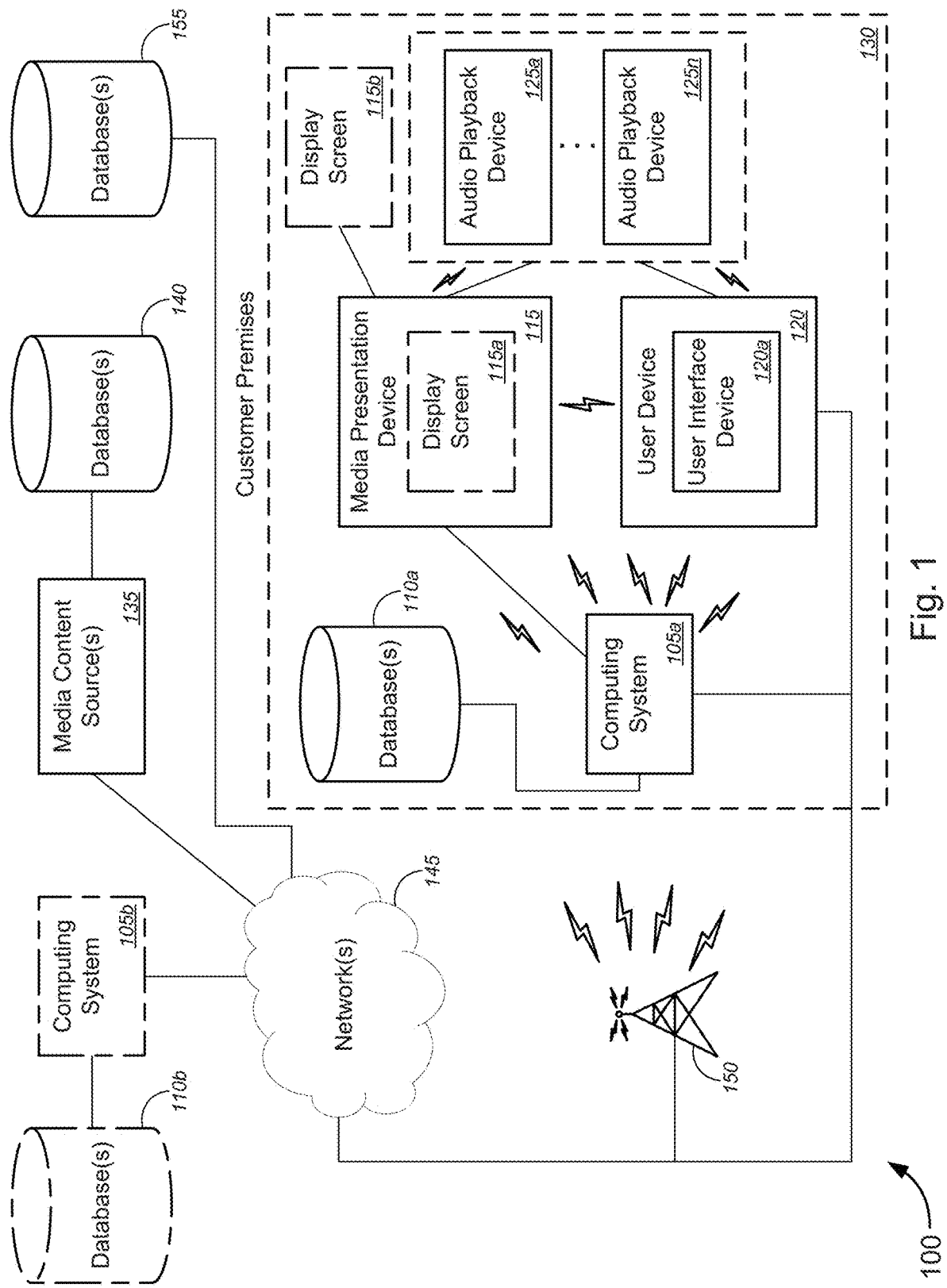
FIG. 1 is a schematic diagram illustrating a system for implementing automatic audio optimization, in accordance with various embodiments.

Various embodiments provide tools and techniques for implementing media content streaming or playback, and, more particularly, to methods, systems, and apparatuses for implementing automatic audio optimization (in some cases, for streaming services, or the like).

In various embodiments, a computing system might receive user input from a user indicating a request for media content for presentation to the user by a media presentation device or the like. The computing system might initiate or perform database lookup in one or more databases for audio parameter settings associated with the requested media content. According to some embodiments, the audio parameter settings might include, but are not limited to, at least one of frequency response settings, reverb settings, time domain adjustment settings, settings for phase relationship between audio channels, or subwoofer cross-over frequency settings, and/or the like, e.g., to account for multichannel setups or the like. In some instances, the frequency response settings might include, without limitation, one of a linear frequency response, a midrange-enhanced frequency response, a bass-enhanced frequency response, a treble-enhanced frequency response, or a combination bass-enhanced and treble-enhanced frequency response, and/or the like. In some cases, the audio parameter settings are listed among a plurality of audio parameter settings in one or more lookup tables in the one or more databases. In some embodiments, the one or more lookup tables might be at least one of refreshed as part of updates for the media presentation device, refreshed using specific pushes to update dedicated content, refreshed on a periodic basis using a scheduling mechanism, refreshed in response to power-up of the media presentation device, or refreshed in response to a user request by the user to refresh, and/or the like.

The computing system might determine whether the one or more databases contain audio parameter settings specifically associated with the requested media content. Based on a determination that the one or more databases contain audio parameter settings specifically associated with the requested media content, the computing system might determine whether the one or more databases contain audio parameter settings specifically for a plurality of portions of the requested media content (i.e., for media content that has multiple audio-distinct portions, including, but not limited to, dramatic scenes, action scenes, comedic scenes, and/or the like). If so, the computing system might retrieve, from the one or more databases, the audio parameter settings specifically for each of the plurality of portions of the requested media content, and automatically reconfigure one or more audio playback devices with the retrieved audio parameter settings specifically for each of the plurality of portions of the requested media content when the corresponding portion of the requested media content is being presented to the user by the media presentation device. If not, the computing system might retrieve, from the one or more databases, the audio parameter settings specifically associated with the requested media content (as a whole or overall), and automatically reconfigure the one or more audio playback devices with the retrieved audio parameter settings specifically associated with the requested media content.

Based on a determination that the one or more databases do not contain audio parameter settings specifically associated with the requested media content, the computing system might determine whether the one or more databases contain audio parameter settings associated with a content category to which the requested media content belongs. Based on a determination that the one or more databases contain audio parameter settings associated with a content category to which the requested media content belongs, the computing system might retrieve, from the one or more databases, the audio parameter settings associated with the content category to which the requested media content belongs, and automatically reconfigure the one or more audio playback devices with the retrieved audio parameter settings associated with the content category to which the requested media content belongs. According to some embodiments, the content category might include, without limitation, at least one of news program, talk show, documentaries, action, drama, comedy, science fiction, fantasy, sports, children's programming, pop music, rock music, country music, techno music, metal music, classical music, or instrumental music, and/or the like.

Based on a determination that the one or more databases do not contain audio parameter settings specifically associated with the requested media content and do not contain audio parameter settings associated with a content category to which the requested media content belongs, the computing system might select default audio parameter settings, and automatically reconfigure the one or more audio playback devices with the selected default audio parameter settings.

Merely by way of example, in some embodiments, automatically reconfiguring one or more audio playback devices with the retrieved audio parameter settings might comprise the computing system extracting one or more audio portions of the requested media content, adjusting the retrieved audio parameter settings for each of the one or more audio portions of the requested media content, and inserting the resultant one or more audio portions of the requested media content. According to some embodiments, the one or more audio playback devices might be either reconfigured with the retrieved audio parameter settings prior to presentation of the requested media content by the media presentation device, or reconfigured with the retrieved audio parameter settings concurrent with presentation of the requested media content by the media presentation device. In some embodiments, adjusting the retrieved audio parameter settings for each of the one or more audio portions of the requested media content might comprise the computing system identifying the one or more audio playback devices, determining audio characteristics of the identified one or more audio playback devices, and adjusting the retrieved audio parameter settings for each of the one or more audio portions of the requested media content that take into account the determined audio characteristics of the identified one or more audio playback devices.

In some embodiments, the computing system and the media presentation device might be embodied in the same device. Alternatively, or additionally, the media presentation device might comprise at least one of the one or more audio playback devices. Merely by way of example, in some cases, the computing system comprises at least one of a set-top box ("STB"), a television, an Internet protocol television ("IPTV"), a media playback device, a media streaming device, a Blu-ray disc ("BD") playback device, a digital video disc ("DVD") playback device, a video on demand ("VoD") platform, a video streaming platform, a digital video recording ("DVR") platform, a gaming console, an audio playback device, a compact disc ("CD") playback device, an audio on demand ("AoD") platform, an audio streaming platform, a smart phone, a tablet computer, a laptop computer, a display device, a desktop computer, a server computer over a network, or a cloud-based computing system. According to some embodiments, the one or more audio playback devices might comprise at least one of one or more external speakers, one or more headphones, one or more earbuds, or one or more integrated speakers, and/or the like. The one or more integrated speakers might comprise speakers that are integrated in at least one of a television, an Internet protocol television ("IPTV"), a media playback device, a media streaming device, a video on demand ("VoD") platform, a video streaming platform, a gaming console, an audio playback device, a compact disc ("CD") playback device, an audio on demand ("AoD") platform, an audio streaming platform, a smart phone, a tablet computer, a laptop computer, a display device, or a desktop computer, and/or the like.

In the context of this disclosure, in some embodiments, the media presentation device or media play could be part of hardware or software for a set top box, could be a separate hardware or software unit, or could be run as software on a user's TV. Additionally, the term "media player" or "media presentation device" might refer to any software or hardware that is capable of decrypting and decoding a video and/or audio signal, and that is capable of outputting these signals to a display device and/or audio system in either an analog or digital format, or both. Herein, TV can refer to any device capable of displaying video images, such as a television, monitor, projector, or the like. Herein also, the term "content" or "media content" can be applied either to a video or audio channel (whether live, delayed, or stored) or to on-demand content (e.g., video-on-demand asset, individual audio content, or the like). Also in the context of this disclosure, the terms "channel" and "stream" may be interchangeable.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, media content streaming or downloading technology, media content optimization technology, audio (stream or signal) optimization technology, and/or the like. In other aspects, certain embodiments, can improve the functioning of user equipment or systems themselves (e.g., media players, set-top boxes ("STBs"), media content streaming or downloading systems, audio playback devices, etc.), for example, by receiving, with a computing system, user input indicating a request for presentation of media content; initiating, with the computing system, database lookup in a database for audio parameter settings associated with the requested media content; determining, with the computing system, whether the database contains audio parameter settings specifically associated with the requested media content; if so, retrieving, with the computing system, the audio parameter settings and automatically reconfiguring, with the computing system, an audio playback device(s) with the retrieved audio parameter settings; if not, determining, with the computing system, whether the database contains audio parameter settings associated with a content category to which the requested media content belongs; if so, retrieving, with the computing system, such audio parameter settings are retrieved and automatically reconfiguring, with the computing system, the audio playback device(s) with the audio parameter settings; and if not, retrieving, with the computing system, default audio parameter settings, and automatically reconfiguring, with the computing system, the audio playback device(s) with the default audio parameter settings, and/or the like.

In particular, to the extent any abstract concepts are present in the various embodiments, those concepts can be implemented as described herein by devices, software, systems, and methods that involve specific novel functionality (e.g., steps or operations), such as, receiving, with a computing system, user input indicating a request for presentation of media content; initiating, with the computing system, database lookup in a database for audio parameter settings associated with the requested media content; determining, with the computing system, whether the database contains audio parameter settings specifically associated with the requested media content; if so, retrieving, with the computing system, the audio parameter settings and automatically reconfiguring, with the computing system, an audio playback device(s) with the retrieved audio parameter settings; if not, determining, with the computing system, whether the database contains audio parameter settings associated with a content category to which the requested media content belongs; if so, retrieving, with the computing system, such audio parameter settings are retrieved and automatically reconfiguring, with the computing system, the audio playback device(s) with the audio parameter settings; and if not, retrieving, with the computing system, default audio parameter settings, and automatically reconfiguring, with the computing system, the audio playback device(s) with the default audio parameter settings, and/or the like, to name a few examples, that extend beyond mere conventional computer processing operations. These functionalities can produce tangible results outside of the implementing computer system, including, merely by way of example, optimized presentation of the audio portion of media content to the user thus providing for improved audio playback to the user, and/or the like, at least some of which may be observed or measured by customers and/or service providers.

In an aspect, a method might comprise receiving, with a computing system and from a user, user input indicating a request for media content for presentation to the user by a media presentation device; initiating, with the computing system, database lookup in one or more databases for audio parameter settings associated with the requested media content; and determining, with the computing system, whether the one or more databases contain audio parameter settings specifically associated with the requested media content. Method might further comprise, based on a determination that the one or more databases contain audio parameter settings specifically associated with the requested media content, retrieving, with the computing system and from the one or more databases, the audio parameter settings specifically associated with the requested media content, and automatically reconfiguring, with the computing system, one or more audio playback devices with the retrieved audio parameter settings specifically associated with the requested media content.

In some embodiments, the method might comprise, based on a determination that the one or more databases do not contain audio parameter settings specifically associated with the requested media content, determining, with the computing system, whether the one or more databases contain audio parameter settings associated with a content category to which the requested media content belongs. The method might further comprise, based on a determination that the one or more databases contain audio parameter settings associated with a content category to which the requested media content belongs, retrieving, with the computing system and from the one or more databases, the audio parameter settings associated with the content category to which the requested media content belongs, and automatically reconfiguring, with the computing system, the one or more audio playback devices with the retrieved audio parameter settings associated with the content category to which the requested media content belongs.

According to some embodiments, based on a determination that the one or more databases do not contain audio parameter settings specifically associated with the requested media content and do not contain audio parameter settings associated with a content category to which the requested media content belongs, selecting, with the computing system, default audio parameter settings, and automatically reconfiguring, with the computing system, the one or more audio playback devices with the selected default audio parameter settings. In some cases, the content category might comprise at least one of news program, talk show, documentaries, action, drama, comedy, science fiction, fantasy, sports, children's programming, pop music, rock music, country music, techno music, metal music, classical music, or instrumental music, and/or the like.

In some embodiments, determining whether the one or more databases contain audio parameter settings specifically associated with the requested media content might comprise determining, with the computing system, whether the one or more databases contain audio parameter settings specifically for a plurality of portions of the requested media content. Retrieving the audio parameter settings specifically associated with the requested media content and automatically reconfiguring the one or more audio playback devices with the retrieved audio parameter settings might comprise, based on a determination that the one or more databases contain audio parameter settings specifically for a plurality of portions of the requested media content, retrieving, with the computing system and from the one or more databases, the audio parameter settings specifically for each of the plurality of portions of the requested media content, and automatically reconfiguring, with the computing system, the one or more audio playback devices with the retrieved audio parameter settings for each portion of the plurality of portions of the requested media content when the corresponding portion of the requested media content is being presented to the user by the media presentation device.

In some cases, the one or more audio playback devices might be one of reconfigured with the retrieved audio parameter settings prior to presentation of the requested media content by the media presentation device, or reconfigured with the retrieved audio parameter settings concurrent with presentation of the requested media content by the media presentation device. Merely by way of example, the one or more audio playback devices might comprise at least one of one or more external speakers, one or more headphones, one or more earbuds, or one or more integrated speakers, and/or the like. The one or more integrated speakers might comprise speakers that are integrated in at least one of a television, an Internet protocol television ("IPTV"), a media playback device, a media streaming device, a video on demand ("VoD") platform, a video streaming platform, a gaming console, an audio playback device, a compact disc ("CD") playback device, an audio on demand ("AoD") platform, an audio streaming platform, a smart phone, a tablet computer, a laptop computer, a display device, or a desktop computer, and/or the like.

In some instances, the computing system might comprise at least one of a set-top box ("STB"), a television, an Internet protocol television ("IPTV"), a media playback device, a media streaming device, a Blu-ray disc ("BD") playback device, a digital video disc ("DVD") playback device, a video on demand ("VoD") platform, a video streaming platform, a digital video recording ("DVR") platform, a gaming console, an audio playback device, a compact disc ("CD") playback device, an audio on demand ("AoD") platform, an audio streaming platform, a smart phone, a tablet computer, a laptop computer, a display device, a desktop computer, a server computer over a network, or a cloud-based computing system, and/or the like.

According to some embodiments, the audio parameter settings might comprise at least one of frequency response settings, reverb settings, time domain adjustment settings, settings for phase relationship between audio channels, or subwoofer cross-over frequency settings, and/or the like, e.g., to account for multichannel setups or the like. In some cases, the frequency response settings might comprise one of a linear frequency response, a midrange-enhanced frequency response, a bass-enhanced frequency response, a treble-enhanced frequency response, or a combination base-enhanced and treble-enhanced frequency response, and/or the like.

In some embodiments, the audio parameter settings might be listed among a plurality of audio parameter settings in one or more lookup tables in the one or more databases. In some instances, the one or more lookup tables might be at least one of refreshed as part of updates for the media presentation device, refreshed using specific pushes to update dedicated content, refreshed during updates of content guides such as electronic program guides ("EPG"), refreshed on a periodic basis using a scheduling mechanism, refreshed in response to power-up of the media presentation device, or refreshed in response to a user request by the user to refresh, and/or the like. Merely by way of example, in some cases, the one or more databases might comprise at least one of one or more network-based databases, one or more distributed computing databases, or one or more local databases, and/or the like. The one or more local databases might be integrated within at least one of a set-top box ("STB"), a television, an Internet protocol television ("IPTV"), a media playback device, a media streaming device, a Blu-ray disc ("BD") playback device, a digital video disc ("DVD") playback device, a video on demand ("VoD") platform, a video streaming platform, a digital video recording ("DVR") platform, a gaming console, an audio playback device, a compact disc ("CD") playback device, an audio on demand ("AoD") platform, an audio streaming platform, a smart phone, a tablet computer, a laptop computer, a display device, or a desktop computer, and/or the like.

According to some embodiments, automatically reconfiguring the one or more audio playback devices with the retrieved audio parameter settings might comprise: extracting, with the computing system, one or more audio portions of the requested media content; adjusting, with the computing system, the retrieved audio parameter settings for each of the one or more audio portions of the requested media content; and inserting, with the computing system, the resultant one or more audio portions of the requested media content. In some cases, adjusting the retrieved audio parameter settings for each of the one or more audio portions of the requested media content might comprise: identifying, with the computing system, the one or more audio playback devices; determining, with the computing system, audio characteristics of the identified one or more audio playback devices and associated transducers; and adjusting, with the computing system, the retrieved audio parameter settings for each of the one or more audio portions of the requested media content that take into account the determined audio characteristics of the identified one or more audio playback devices and associated transducers.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive, from a user, user input indicating a request for media content for presentation to the user by a media presentation device; initiate database lookup in one or more databases for audio parameter settings associated with the requested media content; determine whether the one or more databases contain audio parameter settings specifically associated with the requested media content; and, based on a determination that the one or more databases contain audio parameter settings specifically associated with the requested media content, retrieve, from the one or more databases, the audio parameter settings specifically associated with the requested media content, and automatically reconfigure one or more audio playback devices with the retrieved audio parameter settings specifically associated with the requested media content.

According to some embodiments, the set of instructions, when executed by the at least one processor, might further cause the apparatus to: based on a determination that the one or more databases do not contain audio parameter settings specifically associated with the requested media content, determine whether the one or more databases contain audio parameter settings associated with a content category to which the requested media content belongs; and based on a determination that the one or more databases contain audio parameter settings associated with a content category to which the requested media content belongs, retrieve, from the one or more databases, the audio parameter settings associated with the content category to which the requested media content belongs, and automatically reconfigure the one or more audio playback devices with the retrieved audio parameter settings associated with the content category to which the requested media content belongs.

In some instances, the set of instructions, when executed by the at least one processor, might further cause the apparatus to, based on a determination that the one or more databases do not contain audio parameter settings specifically associated with the requested media content and do not contain audio parameter settings associated with a content category to which the requested media content belongs, select default audio parameter settings, and automatically reconfigure the one or more audio playback devices with the selected default audio parameter settings.

In some cases, the apparatus might comprise at least one of a set-top box ("STB"), a television, an Internet protocol television ("IPTV"), a media playback device, a media streaming device, a Blu-ray disc ("BD") playback device, a digital video disc ("DVD") playback device, a video on demand ("VoD") platform, a video streaming platform, a digital video recording ("DVR") platform, a gaming console, an audio playback device, a compact disc ("CD") playback device, an audio on demand ("AoD") platform, an audio streaming platform, a smart phone, a tablet computer, a laptop computer, a display device, a desktop computer, a server computer over a network, or a cloud-based computing system, and/or the like.

In yet another aspect, a system might comprise a computing system, a media presentation system, and one or more audio playback devices. The computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive, from a user, user input indicating a request for media content for presentation to the user; initiate database lookup in one or more databases for audio parameter settings associated with the requested media content; determine whether the one or more databases contain audio parameter settings specifically associated with the requested media content; based on a determination that the one or more databases contain audio parameter settings specifically associated with the requested media content, retrieve, from the one or more databases, the audio parameter settings specifically associated with the requested media content, and automatically reconfigure one or more audio playback devices with the retrieved audio parameter settings specifically associated with the requested media content; and send the requested media content and the audio parameter settings to a media presentation system.

The media presentation system might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the media presentation system to: receive the requested media content and the audio parameter settings; present the requested media content to the user; and send audio content corresponding to the requested media content and the audio parameter settings to the one or more audio playback devices.

The one or more audio playback devices might each comprise at least one third processor and a third non-transitory computer readable medium communicatively coupled to the at least one third processor. The third non-transitory computer readable medium might have stored thereon computer software comprising a third set of instructions that, when executed by the at least one third processor, causes each audio playback device to: receive the audio content corresponding to the requested media content and the audio parameter settings; and present the audio content corresponding to the requested media content, as adjusted by the audio parameter settings.

According to some embodiments, the computing system and the media presentation device are embodied in the same device. In some cases, the media presentation device might comprise at least one of the one or more audio playback devices. In some embodiments, the computing system might comprise at least one of a set-top box ("STB"), a television, an Internet protocol television ("IPTV"), a media playback device, a media streaming device, a Blu-ray disc ("BD") playback device, a digital video disc ("DVD") playback device, a video on demand ("VoD") platform, a video streaming platform, a digital video recording ("DVR") platform, a gaming console, an audio playback device, a compact disc ("CD") playback device, an audio on demand ("AoD") platform, an audio streaming platform, a smart phone, a tablet computer, a laptop computer, a display device, a desktop computer, a server computer over a network, or a cloud-based computing system, and/or the like.

Merely by way of example, in some instances, the one or more audio playback devices might comprise at least one of one or more external speakers, one or more headphones, one or more earbuds, or one or more integrated speakers, and/or the like. The one or more integrated speakers might comprise speakers that are integrated in at least one of a television, an Internet protocol television ("IPTV"), a media playback device, a media streaming device, a video on demand ("VoD") platform, a video streaming platform, a gaming console, an audio playback device, a compact disc ("CD") playback device, an audio on demand ("AoD") platform, an audio streaming platform, a smart phone, a tablet computer, a laptop computer, a display device, or a desktop computer, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-7 illustrate some of the features of the method, system, and apparatus for implementing media content streaming or playback, and, more particularly, to methods, systems, and apparatuses for implementing automatic audio optimization (in some cases, for streaming services or the like), as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

With reference to the figures, FIG. 1 is a schematic diagram illustrating a system 100 for implementing automatic audio optimization, in accordance with various embodiments.

In the non-limiting embodiment of FIG. 1, system 100 might comprise a computing system 105a and a data store or database 110a that is local to the computing system 105a. In some cases, the database 110a might be external, yet communicatively coupled, to the computing system 105a. In other cases, the database 110a might be integrated within the computing system 105a. System 100, according to some embodiments, might further comprise one or more media presentation devices 115 (collectively, "media presentation devices 115" or the like), which might each include a display screen 115a or might be communicatively coupled to an external display screen(s) 115b, and one or more user devices 120 (collectively, "user devices 120" or the like), which, in some cases, might each include a touchscreen display or touchscreen display device 120a or some other user interface device, and/or the like. In some cases, system 100 might further, or optionally, comprise one or more (external) audio playback devices 125a-125n (collectively, "audio playback devices 125" or "speakers 125" or the like), and/or the like.

Each of the one or more media presentation devices 115 and/or the one or more user devices 120 might communicatively couple to the computing system 105a, and/or to each other, either via wireless connection and/or via wired connection. The one or more user devices 120 might each receive user input from a user (in various embodiments, receiving touch input from the user via the touchscreen display 120a and/or receiving other user input from the user via another type(s) of user interface device, or the like), and might each relay the user input to the computing system 105a and/or the media presentation device 115, according to some embodiments. In some cases, the user devices 120 might include, without limitation, at least one of a dedicated remote control device (with or without touchscreen display) that is associated with the computing system 105a and/or the media presentation device 115, a universal remote control device (with or without touchscreen display) that has been paired, synced, or synchronized with the computing system 105a and/or the media presentation device 115, a tablet computer that has been paired, synced, or synchronized with the computing system 105a and/or the media presentation device 115, a smart phone that has been paired, synced, or synchronized with the computing system 105a and/or the media presentation device 115, or other portable device (with or without touchscreen display) that has been paired, synced, or synchronized with the computing system 105a and/or the media presentation device 115, and/or the like. In some cases, the computing system 105a, the database 110a, the one or more media presentation devices 115 (including the display screen(s) 115a or 115b, and/or the audio playback device(s) 125, etc.), and the user device(s) 120 may be disposed within a customer premises 130, which might be one of a single family house, a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, an industrial building or complex, and/or the like.

In some embodiments, the computing system 105a might comprise one of a processor on the media presentation device running a software application ("app"), a processor on the user device running an app, a media player, and/or the like. In some cases, the media presentation device 115 might include, but is not limited to, one of a set-top box ("STB"), a media player, a gaming console, a server computer, a desktop computer, or a laptop computer, and/or the like. The media player might include, without limitation, one of a digital versatile disc or digital video disc ("DVD") player, a Blu-ray disc ("BD") player, a video on demand ("VoD") platform, a digital video recording ("DVR") device, a streaming video player, an audio playback device, a compact disc ("CD") playback device, an audio on demand ("AoD") platform, a streaming music player, or a streaming game player, and/or the like. In some instances, the one or more media presentation devices 115 might include, but are not limited to, at least one of one or more monitors (e.g., computer monitor or laptop monitor, or the like), one or more television sets (e.g., smart television sets, Internet protocol television ("IPTV"), or other television sets, or the like), and/or the like. In some cases, the user device 120 might include, without limitation, one of a desktop computer, a laptop computer, a tablet computer, a smart phone, a mobile phone, a personal digital assistant, a remote control device, or a portable gaming device, and/or the like.

System 100 might further comprise one or more media content sources or servers 135 and corresponding databases 140 that might communicatively couple to the computing system 105a via one or more networks 145 (and in some cases, via one or more telecommunications relay systems 150, which might include, without limitation, one or more wireless network interfaces (e.g., wireless modems, wireless access points, and the like), one or more towers, one or more satellites, and/or the like). The lightning bolt symbols are used to denote wireless communications between the one or more telecommunications relay systems 150 and the computing system 105a, between the one or more telecommunications relay systems 150 and each of at least one of the user devices 120, between the computing system 105a and each of at least one of the media presentation devices 115, between the computing system 105a and each of at least one of the user devices 120, between the media presentation device 115 and the user devices 120, between the computing system 105a and each of the one or more audio playback devices 125a-125n, between the media presentation device 115 and each of at least one of the one or more audio playback devices 125a-125n, between the user devices 120 and each of at least one of the one or more audio playback devices 125a-125n, and/or the like. According to some embodiments, alternative or additional to the computing system 105a and corresponding database 110a being disposed within customer premises 130, system 100 might comprise remote computing system 105b and corresponding database(s) 110b that communicatively couple with the one or more media presentation devices 115 and/or with the one or more user devices 120 in the customer premises via the one or more networks 145 (and in some cases, via the one or more telecommunications relay systems 150). According to some embodiments, remote computing system 105b might comprise at least one of a server computer over a network, a cloud-based computing system over a network, and/or the like.

In operation, computing system 105a or 105b (and/or media presentation device 115) might receive user input from a user indicating a request for media content for presentation to the user by the media presentation device 115 or the like. The computing system 105a or 105b (and/or media presentation device 115) might initiate or perform database lookup in one or more databases 110a, 110b, 140, and/or 155 for audio parameter settings associated with the requested media content. According to some embodiments, the audio parameter settings might include, but are not limited to, at least one of frequency response settings, reverb settings, time domain adjustment settings, settings for phase relationship between audio channels, or subwoofer crossover frequency settings, and/or the like, e.g., to account for multichannel setups or the like. In some instances, the frequency response settings might include, without limitation, one of a linear frequency response, a midrange-enhanced frequency response, a bass-enhanced frequency response, a treble-enhanced frequency response, or a combination base-enhanced and treble-enhanced frequency response, and/or the like. In some cases, the audio parameter settings are listed among a plurality of audio parameter settings in one or more lookup tables in the one or more databases. In some embodiments, the one or more lookup tables might be at least one of refreshed as part of updates for the media presentation device 115, refreshed using specific pushes to update dedicated content, refreshed on a periodic basis using a scheduling mechanism, refreshed in response to power-up of the media presentation device, or refreshed in response to a user request by the user to refresh, and/or the like.

The computing system 105a or 105b (and/or media presentation device 115) might determine whether the one or more databases contain audio parameter settings specifically associated with the requested media content. Based on a determination that the one or more databases contain audio parameter settings specifically associated with the requested media content, the computing system 105a or 105b (and/or media presentation device 115) might determine whether the one or more databases contain audio parameter settings specifically for a plurality of portions of the requested media content (i.e., for media content that has multiple audio-distinct portions, including, but not limited to, dramatic scenes, action scenes, comedic scenes, and/or the like). If so, the computing system 105a or 105b (and/or media presentation device 115) might retrieve, from the one or more databases, the audio parameter settings specifically for each of the plurality of portions of the requested media content, and automatically reconfigure one or more audio playback devices 125a-125n with the retrieved audio parameter settings specifically for each of the plurality of portions of the requested media content when the corresponding portion of the requested media content is being presented to the user by the media presentation device. If not, the computing system 105a or 105b (and/or media presentation device 115) might retrieve, from the one or more databases, the audio parameter settings specifically associated with the requested media content (as a whole or overall), and automatically reconfigure the one or more audio playback devices 125a-125n with the retrieved audio parameter settings specifically associated with the requested media content.

Based on a determination that the one or more databases do not contain audio parameter settings specifically associated with the requested media content, the computing system 105a or 105b (and/or media presentation device 115) might determine whether the one or more databases contain audio parameter settings associated with a content category to which the requested media content belongs. Based on a determination that the one or more databases contain audio parameter settings associated with a content category to which the requested media content belongs, the computing system 105a or 105b (and/or media presentation device 115) might retrieve, from the one or more databases, the audio parameter settings associated with the content category to which the requested media content belongs, and automatically reconfigure the one or more audio playback devices with the retrieved audio parameter settings associated with the content category to which the requested media content belongs. According to some embodiments, the content category might include, without limitation, at least one of news program, talk show, documentaries, action, drama, comedy, science fiction, fantasy, sports, children's programming, pop music, rock music, country music, techno music, metal music, classical music, or instrumental music, and/or the like.

Based on a determination that the one or more databases do not contain audio parameter settings specifically associated with the requested media content and do not contain audio parameter settings associated with a content category to which the requested media content belongs, the computing system 105a or 105b (and/or media presentation device 115) might select default audio parameter settings, and automatically reconfigure the one or more audio playback devices with the selected default audio parameter settings.

Merely by way of example, in some embodiments, automatically reconfiguring one or more audio playback devices 125a-125n with the retrieved audio parameter settings might comprise the computing system 105a or 105b (and/or media presentation device 115) extracting one or more audio portions of the requested media content, adjusting the retrieved audio parameter settings for each of the one or more audio portions of the requested media content, and inserting the resultant one or more audio portions of the requested media content. According to some embodiments, the one or more audio playback devices 125a-125n might be either reconfigured with the retrieved audio parameter settings prior to presentation of the requested media content by the media presentation device 115, or reconfigured with the retrieved audio parameter settings concurrent with presentation of the requested media content by the media presentation device 115. In some embodiments, adjusting the retrieved audio parameter settings for each of the one or more audio portions of the requested media content might comprise the computing system 105a or 105b (and/or media presentation device 115) identifying the one or more audio playback devices, determining audio characteristics of the identified one or more audio playback devices 125a-125n, and adjusting the retrieved audio parameter settings for each of the one or more audio portions of the requested media content that take into account the determined audio characteristics of the identified one or more audio playback devices 125a-125n.

These and other functions of the system 100 (and its components) are described in greater detail below with respect to FIGS. 2-5.

Figure 2A:
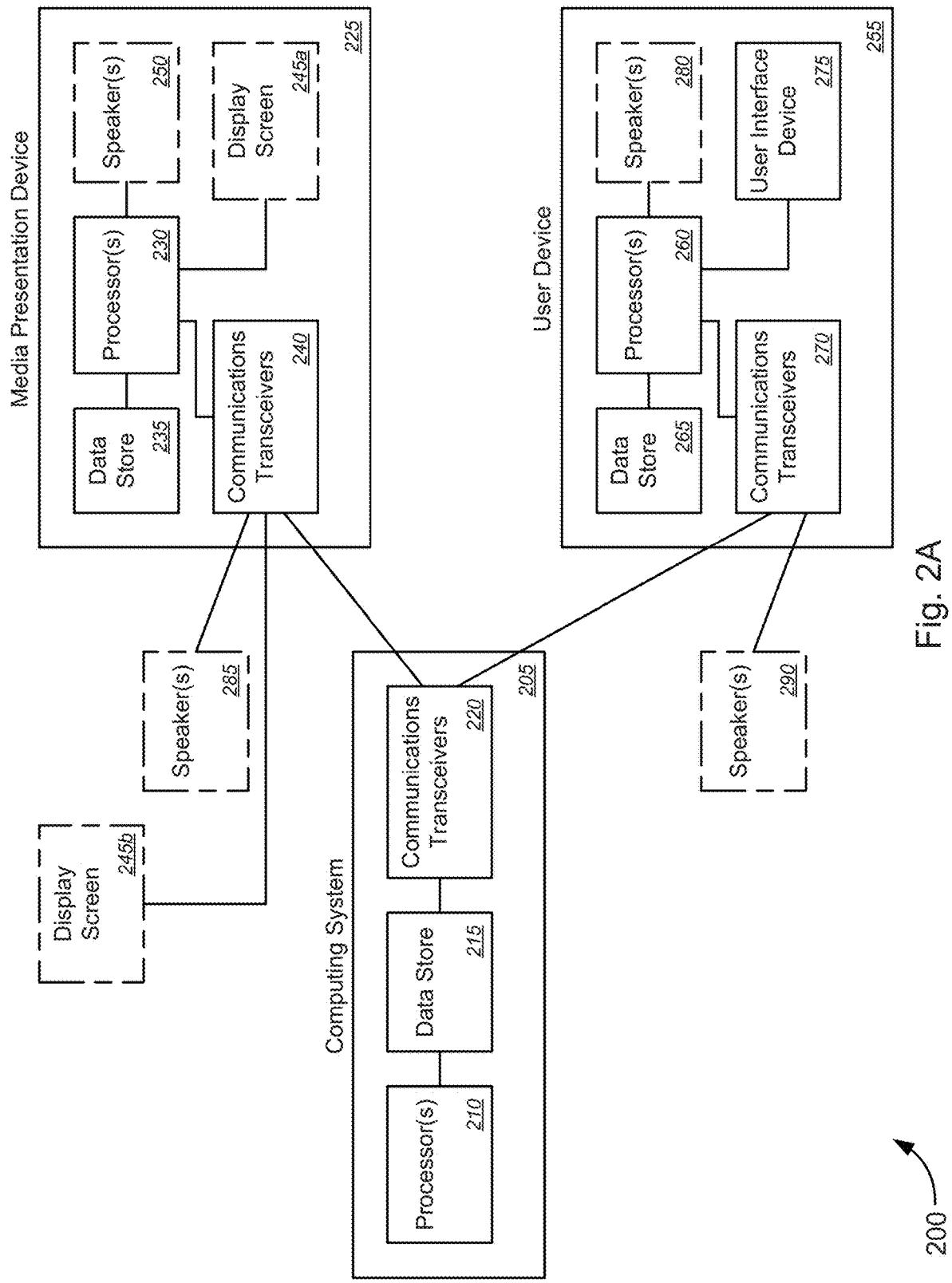
FIGS. 2A and 2B are schematic diagrams illustrating various embodiments of a system that may be used for implementing automatic audio optimization.
Figure 2B:
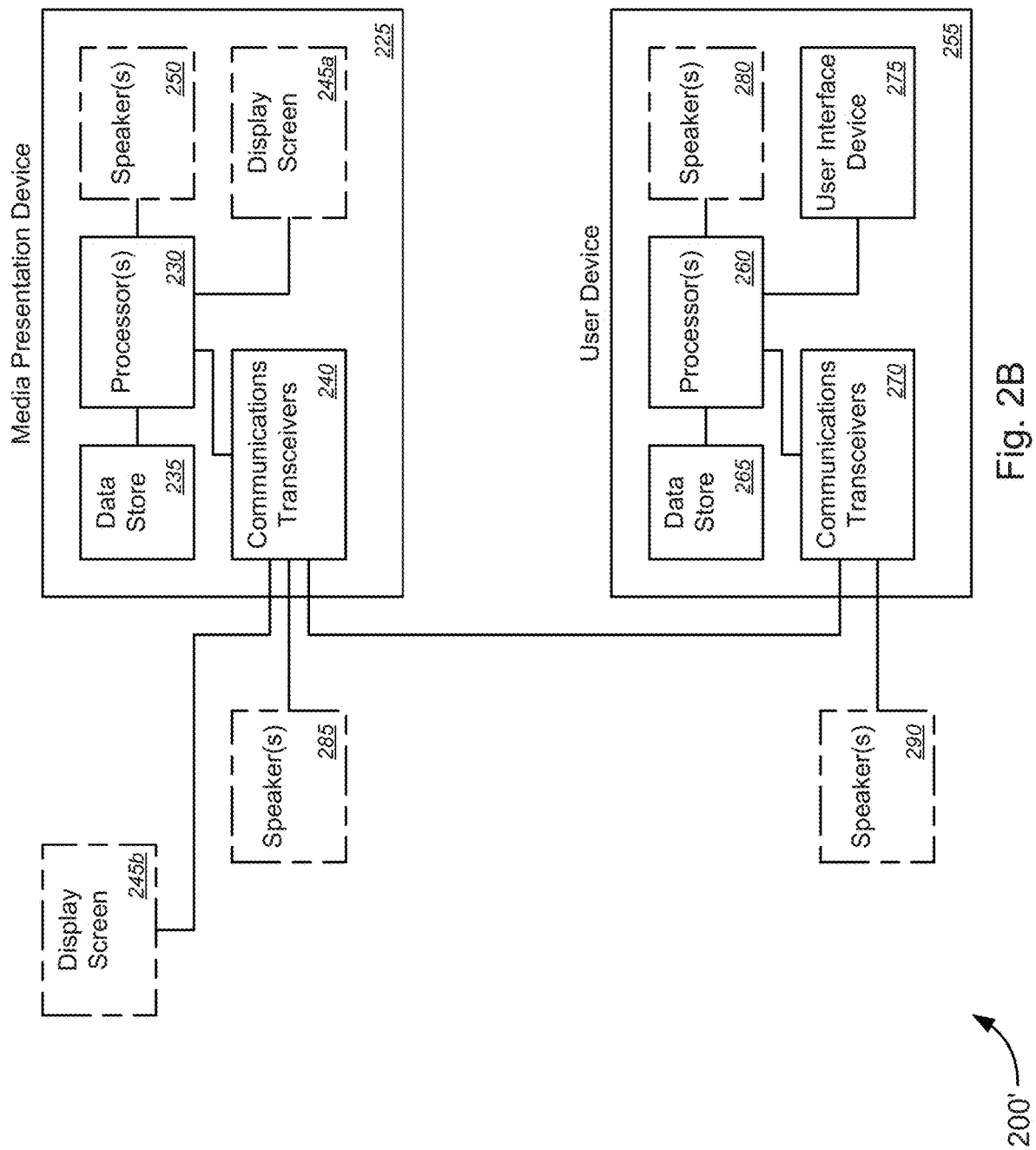

FIGS. 2A and 2B (collectively, "FIG. 2") are schematic diagrams illustrating various embodiments 200 and 200' of a system that may be used for implementing automatic audio optimization.

In the non-limiting embodiment of FIG. 2A, according to some embodiments, system 200 might comprise a computing system 205 (which might correspond to computing system 105a or 105b of system 100 of FIG. 1, or the like). Computing system 205, in some cases, might comprise one or more processors 210, one or more data stores or data storage devices 215, and one or more communications transceivers 220, and/or the like. System 200 might further comprise one or more media presentation devices 225 (which might correspond to the one or more media presentation devices 115 of system 100 of FIG. 1, or the like), each of which might include, without limitation, one or more processors 230, one or more data stores 235, one or more communications transceivers 240, one or more (built-in) display screens 245a (optional) and/or one or more (external) display screens 245b (optional), and (optionally) one or more (built-in) speakers 250, and/or the like. System 200 might further comprise one or more user devices 255 (which might correspond to the one or more user devices 120 of system 100 of FIG. 1, or the like), each of which might include, but are not limited to, one or more processors 260, one or more data stores 265, one or more communications transceivers 270, one or more user interface devices 275 (e.g., touchscreen display(s) or other user interface device(s)), and (optionally) one or more (built-in) speakers 280, and/or the like. In some cases, system 200 might further comprise one or more external speakers 285 (which might communicatively couple either wirelessly or in a wired manner with at least one of the media presentation devices 225 (in some instances, via communications transceivers 240)) and one or more external speakers 290 (which might communicatively couple either wirelessly or in a wired manner with at least one of the user devices 255 (in some instances, via communications transceivers 270)), and/or the like. The computing system 205 might communicatively couple (via wireless or wired connection) with each of the media presentation devices 225 (in some cases, via communications transceivers 240) and with each of the user devices 255 (in some cases, via communications transceivers 270).

The computing system 205, the one or more media presentation devices 225, the one or more user devices 255, and the one or more (internal) speakers 250 or 280 and the one or more (external) speakers 285 or 290 of system 200 in FIG. 2A are otherwise similar, if not identical, to the computing system 105a or 105b, the one or more media presentation devices 115, the one or more user devices 120, and the one or more audio playback devices 125a-125n, respectively, of system 100 in FIG. 1, and the descriptions of these components of system 100 are applicable to the corresponding components of system 200, respectively.

Turning to the non-limiting embodiment of FIG. 2B, in some embodiments, system 200' might be similar to system 200 of FIG. 2A, except that system 200' might function without the use of a computing system 205 to perform processing functions and to communicate with each of the media presentation device(s) 225 and the user device(s) 255. Rather, system 200' might comprise the one or more media presentation devices 225 (which might correspond to the one or more media presentation devices 115 of system 100 of FIG. 1, or the like), each of which might include, without limitation, one or more processors 230, one or more data stores 235, one or more communications transceivers 240, one or more (built-in) display screens 245a (optional) and/or one or more (external) display screens 245b (optional), and (optionally) one or more (built-in) speakers 250, and/or the like. System 200' might further comprise the one or more user devices 255 (which might correspond to the one or more user devices 120 of system 100 of FIG. 1, or the like), each of which might include, but are not limited to, one or more processors 260, one or more data stores 265, one or more communications transceivers 270, one or more user interface devices 275 (e.g., touchscreen display(s) or other user interface device(s)), and (optionally) one or more (built-in) speakers 280, and/or the like. In some cases, system 200' might further comprise the one or more external speakers 285 (which might communicatively couple either wirelessly or in a wired manner with at least one of the media presentation devices 225 (in some instances, via communications transceivers 240)) and the one or more external speakers 290 (which might communicatively couple either wirelessly or in a wired manner with at least one of the user devices 255 (in some instances, via communications transceivers 270)), and/or the like. At least one media presentation device 225 might communicatively couple (either via wireless or wired connection) with at least one user device 255 (in some cases, via communications transceivers 240 and 270).

The one or more media presentation devices 225, the one or more user devices 255, and the one or more (internal) speakers 250 or 280 and the one or more (external) speakers 285 or 290 of system 200' in FIG. 2B are otherwise similar, if not identical, to the one or more media presentation devices 225, the one or more user devices 255, and the one or more (internal) speakers 250 or 280 and the one or more (external) speakers 285 or 290, respectively, of system 200 in FIG. 2A, and the descriptions of these components of system 200 are applicable to the corresponding components of system 200', respectively.

FIGS. 3A-3D (collectively, "FIG. 3") are schematic diagrams illustrating various embodiments 300, 300', 300", and 300'" of system configurations for implementing automatic audio optimization.

Figure 3A:
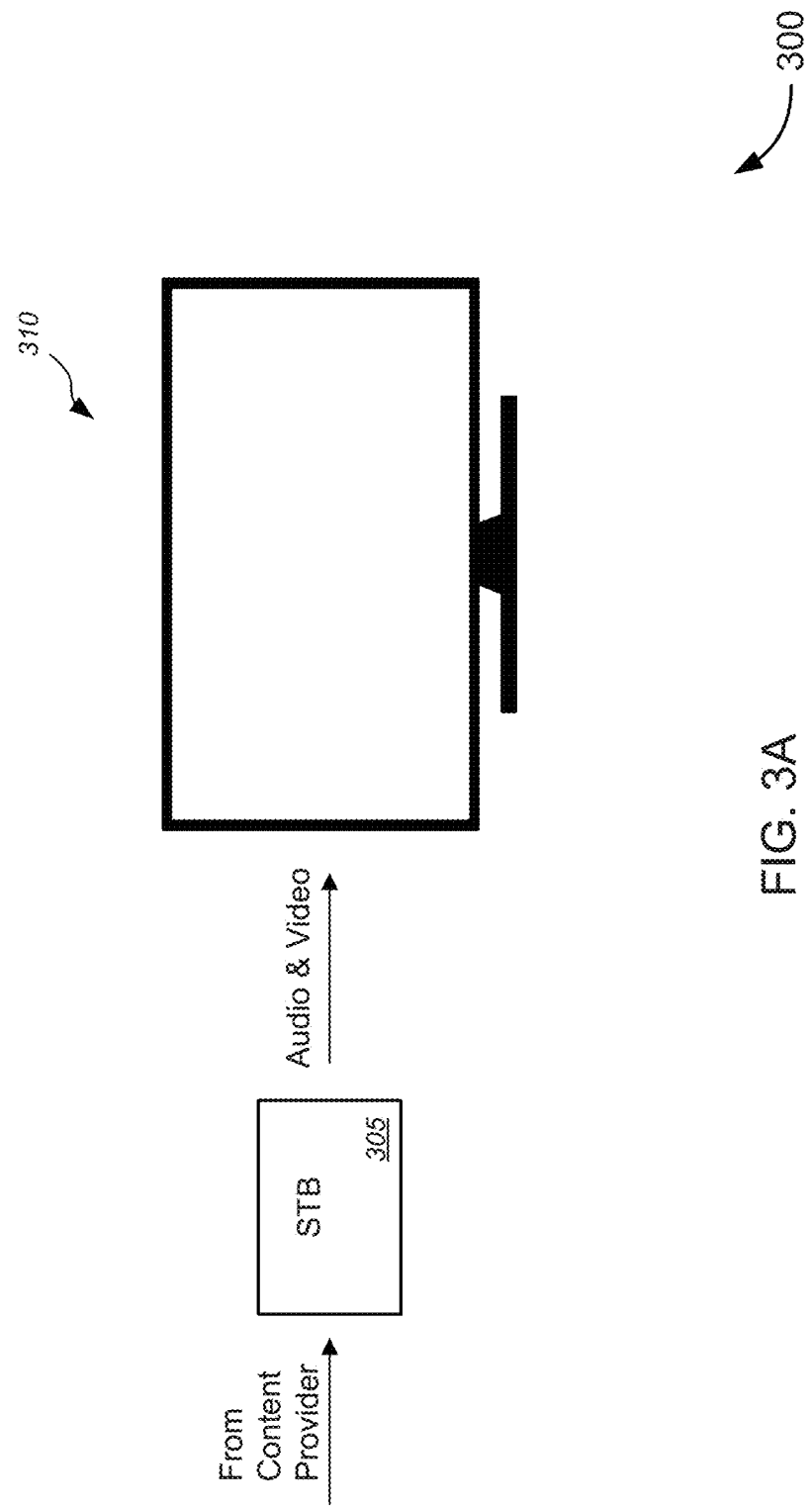
FIGS. 3A-3D are schematic diagrams illustrating various embodiments of system configurations for implementing automatic audio optimization.

With reference to FIG. 3A, system 300 might comprise a set-top box ("STB") 305 (or other media presentation device, or the like) and a display device 310 (e.g., a television, an Internet protocol television ("IPTV"), a monitor, a smart phone, a tablet computer, a laptop computer, or other display device, etc.) that has one or more built-in audio playback devices (e.g., integrated speakers, or the like). The STB or media player 305 extracts the audio portion(s) from the media content stream (e.g., video and audio stream) or signal received from the content provider, adjusts the audio characteristics of the audio portion(s) of the media content stream according to the protocols and techniques described herein, and inserts the resultant audio portion(s) back into the stream or signal prior to the reconstructed stream or signal being sent to the display device 310. In some embodiments, a high-definition multimedia interface ("HDMI") link or cable (or similar type of cable) may be used between the STB or media player 305 and the display device 310.

Figure 3B:
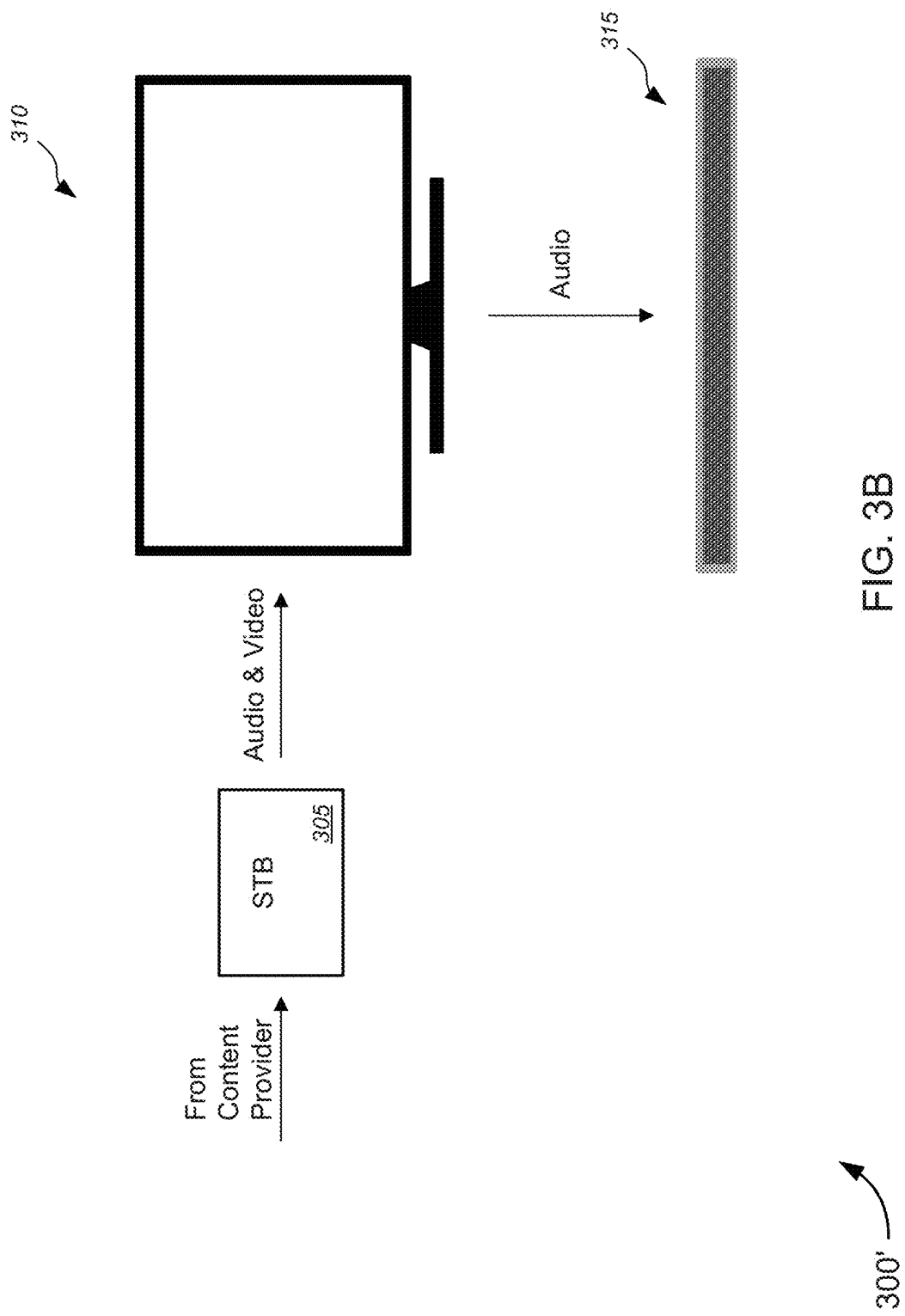

Referring to FIG. 3B, system 300' might comprise a set-top box ("STB") 305 (or other media presentation device, or the like), a display device 310 (e.g., a television, an Internet protocol television ("IPTV"), a monitor, a smart phone, a tablet computer, a laptop computer, or other display device, etc.), and one or more soundbars or other external audio playback devices 315 (e.g., external speakers, or the like). The STB or media player 305 extracts the audio portion(s) from the media content stream (e.g., video and audio stream) or signal received from the content provider, adjusts the audio characteristics of the audio portion(s) of the media content stream according to the protocols and techniques described herein, and inserts the resultant audio portion(s) back into the stream or signal prior to the reconstructed stream or signal being sent to the display device 310. In some embodiments, a high-definition multimedia interface ("HDMI") link or cable may be used between the STB or media player 305 and the display device 310. For display devices 310 with integrated audio playback devices (like in the display device 310 of FIG. 3A), the resultant audio portion(s) may be presented via the integrated audio playback devices in the display device 310. Alternatively or additionally, for display devices 310 without integrated audio playback devices (or even for display devices 310 with integrated audio playback devices), the STB or media player 305 might further identify the one or more soundbars or other external audio playback devices 315, determine audio characteristics of the identified one or more soundbars or other external audio playback devices 315, and adjust the retrieved audio parameter settings for each of the audio portion(s) of the media content stream or signal that take into account the determined audio characteristics of the identified one or more soundbars or other external audio playback devices 315.

Figure 3C:
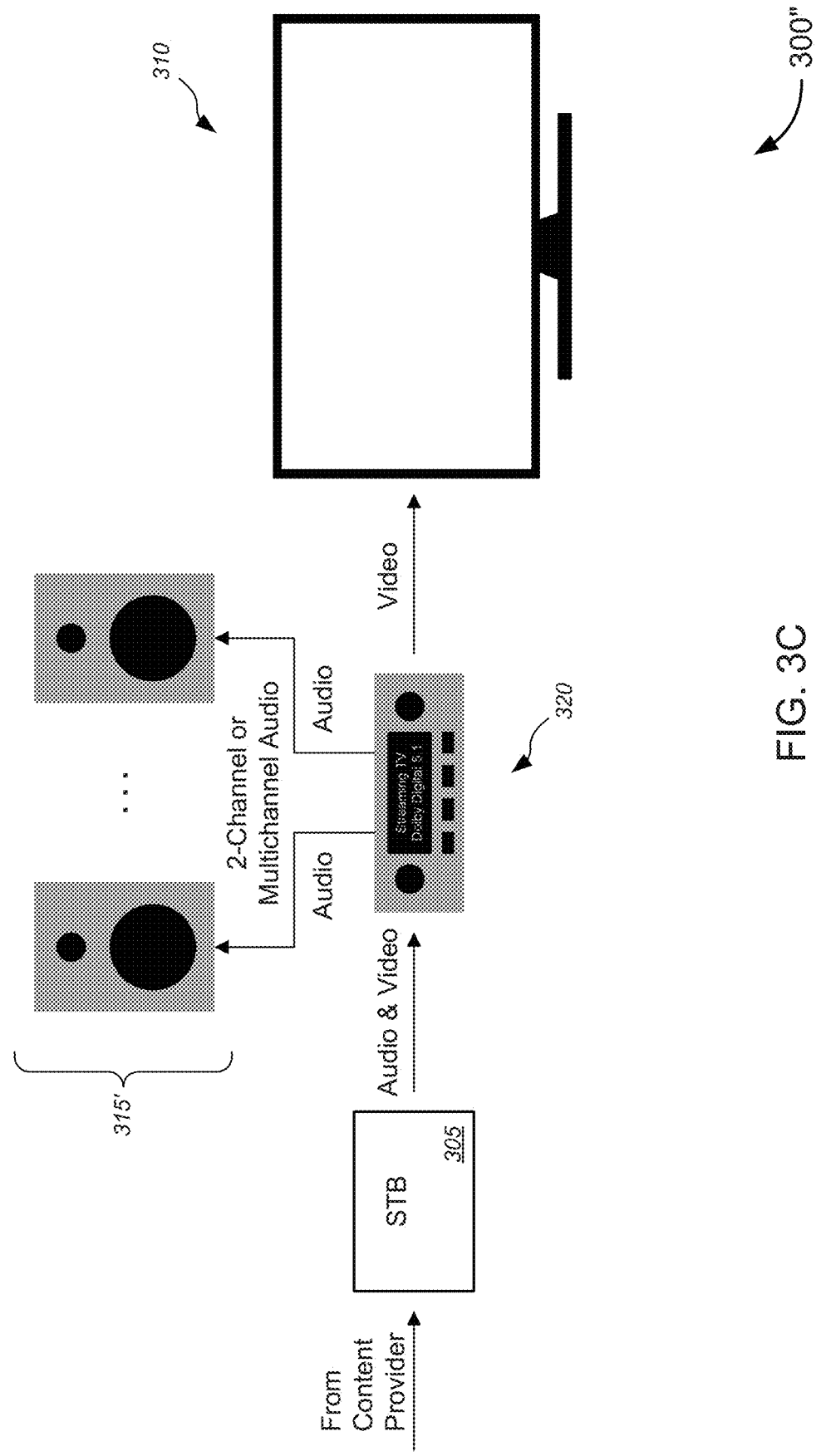

Turning to FIG. 3C, system 300" might comprise a set-top box ("STB") 305 (or other media presentation device, or the like), a display device 310 (e.g., a television, an Internet protocol television ("IPTV"), a monitor, a smart phone, a tablet computer, a laptop computer, or other display device, etc.), and a plurality of external audio playback devices 315' (e.g., 2-channel or multichannel audio playback devices, or the like), and audio/video ("A/V") equipment 320. The STB or media player 305 receives the media content stream (e.g., video and audio stream) or signal received from the content provider and sends the media content stream or signal to the A/V equipment 320. The A/V equipment 320 extracts the audio portion(s) from the media content stream (e.g., video and audio stream) or signal received from the STB or media player 305, adjusts the audio characteristics of the audio portion(s) of the media content stream according to the protocols and techniques described herein, sends the audio portion(s) of the media content stream or signal to the plurality of external audio playback devices 315', and sends the video portion(s) of the media content stream to the display device 310. In some embodiments, a high-definition multimedia interface ("HDMI") link or cable (or similar type of cable) may be used between the STB or media player 305 and the A/V equipment 320, and between the A/V equipment 320 and the display device 310. In some cases, wired audio cables (e.g., S/PDIF cable, analog cable, or the like), optical audio cables (e.g., TOSLINK cable, S/PDIF cable, or the like), and/or HDMI cables, or the like, may be used between the A/V equipment 320 and the plurality of external audio playback devices 315'. According to some embodiments, the A/V equipment 320 might further identify each of the plurality of external audio playback devices 315', determine audio characteristics of the identified plurality of external audio playback devices 315', and adjust the retrieved audio parameter settings for each of the audio portion(s) of the media content stream or signal that take into account the determined audio characteristics of the identified plurality of external audio playback devices 315'.

Figure 3D:
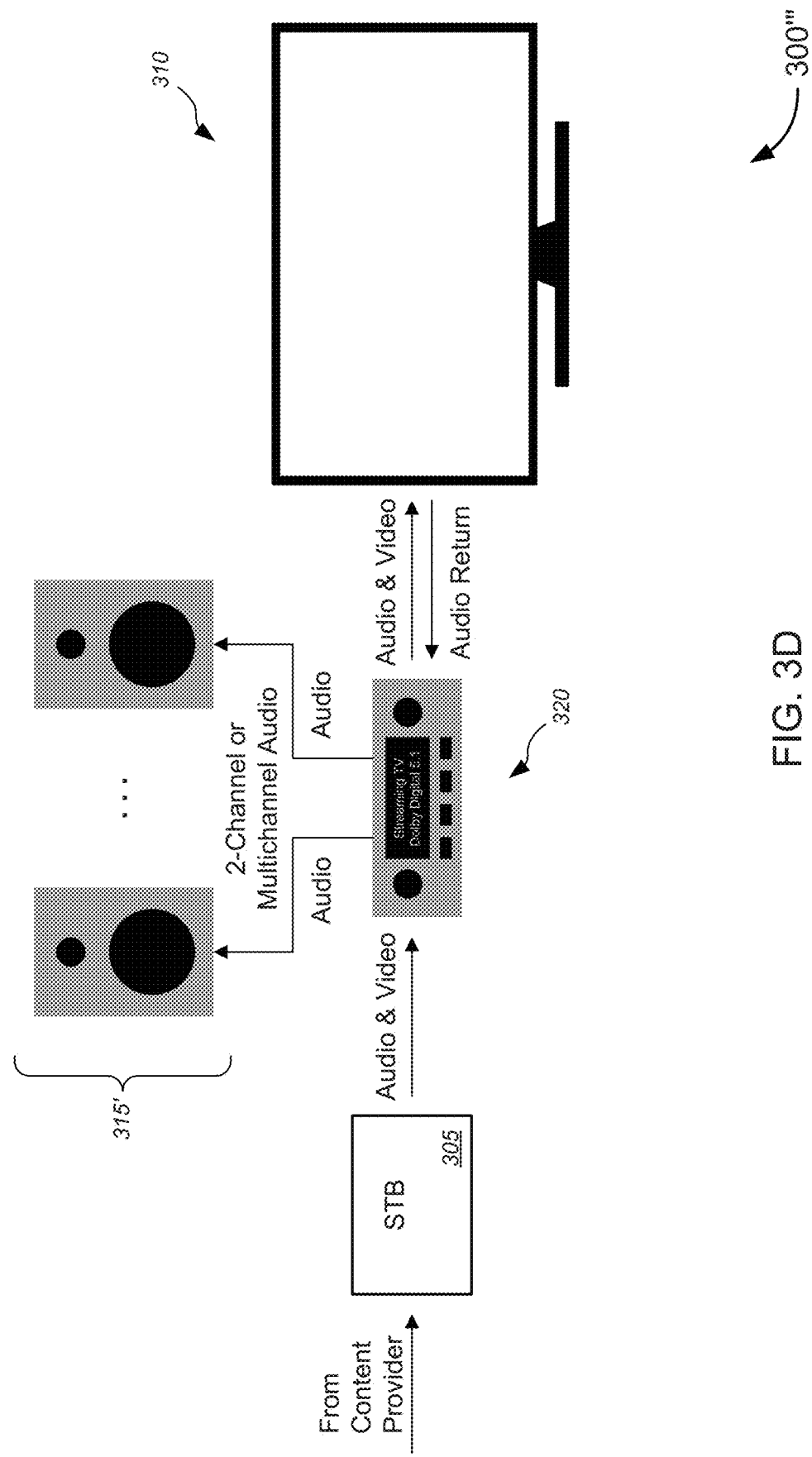

With reference to FIG. 3D, system 300'" might comprise a set-top box ("STB") 305 (or other media presentation device, or the like), a display device 310 (e.g., a television, an Internet protocol television ("IPTV"), a monitor, a smart phone, a tablet computer, a laptop computer, or other display device, etc.), and a plurality of external audio playback devices 315' (e.g., 2-channel or multichannel audio playback devices, or the like), and audio/video ("A/V") equipment 320. The STB or media player 305 receives the media content stream (e.g., video and audio stream) or signal received from the content provider and sends the media content stream or signal to the A/V equipment 320. The A/V equipment 320 extracts the audio portion(s) from the media content stream (e.g., video and audio stream) or signal received from the STB or media player 305, adjusts the audio characteristics of the audio portion(s) of the media content stream according to the protocols and techniques described herein, sends the audio portion(s) of the media content stream or signal to the plurality of external audio playback devices 315', inserts the resultant audio portion(s) back into the stream or signal prior to the reconstructed stream or signal being sent to the display device 310, and sends the reconstructed media content stream or signal to the display device 310. In some embodiments, a high-definition multimedia interface ("HDMI") link or cable (or similar type of cable) may be used between the STB or media player 305 and the A/V equipment 320, and between the A/V equipment 320 and the display device 310. In some cases, wired audio cables (e.g., S/PDIF cable, analog cable, or the like), optical audio cables (e.g., TOSLINK cable, S/PDIF cable, or the like), and/or HDMI cables, or the like, may be used between the A/V equipment 320 and the plurality of external audio playback devices 315'. According to some embodiments, the A/V equipment 320 might further identify each of the plurality of external audio playback devices 315', determine audio characteristics of the identified plurality of external audio playback devices 315', and adjust the retrieved audio parameter settings for each of the audio portion(s) of the media content stream or signal that take into account the determined audio characteristics of the identified plurality of external audio playback devices 315'. In some cases, where HDMI cables are used for connecting the A/V equipment 320 and the display device 310, the audio return channel ("ARC") of the HDMI cable may be used to carry an audio return signal back to the A/V equipment 320.

According to some embodiments, the identification of audio playback devices, the determination of audio characteristics of the identified audio playback devices, and the adjustment of the audio parameter settings of the audio portion(s) of the media content stream or signal that take into account the determined audio characteristics of the identified audio playback devices may also be applicable to the display devices 310 that have integrated speakers or the like, as well as to wireless audio playback devices (e.g., Bluetooth speakers, WiFi speakers, etc.), or the like.

Figure 4B:
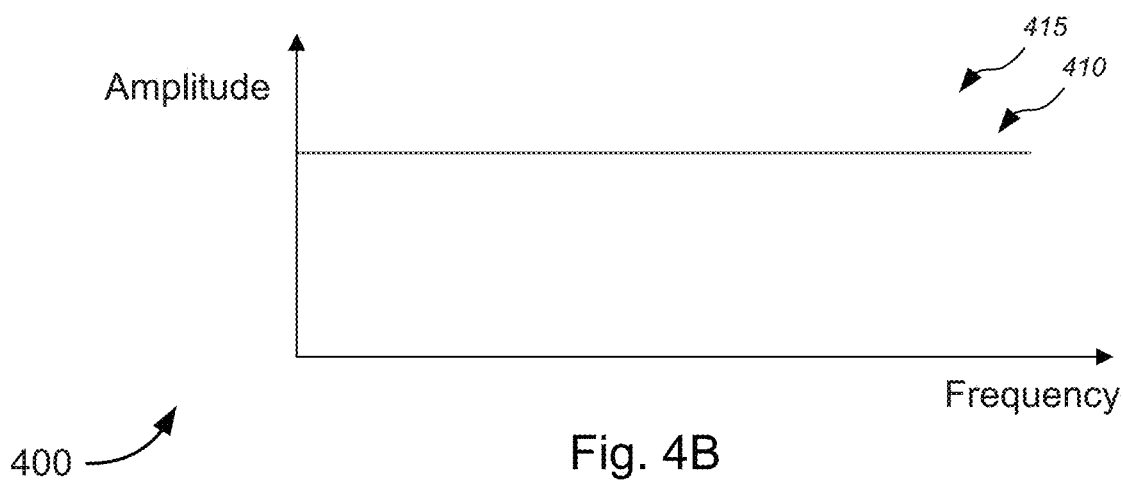
FIGS. 4B-4D are graphical diagrams illustrating various exemplary frequency response adjustments that may be used when implementing automatic audio optimization, in accordance with various embodiments.
Figure 4C:
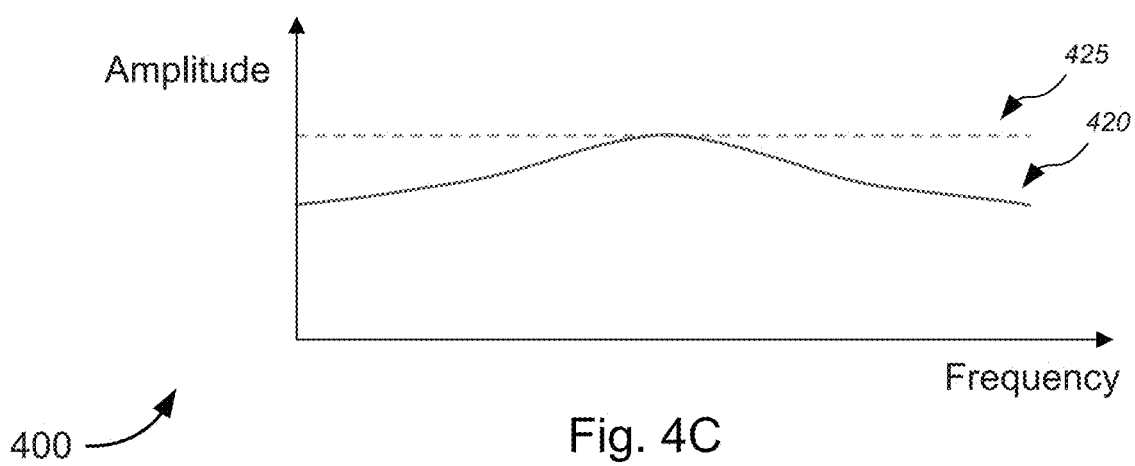
Figure 4D:
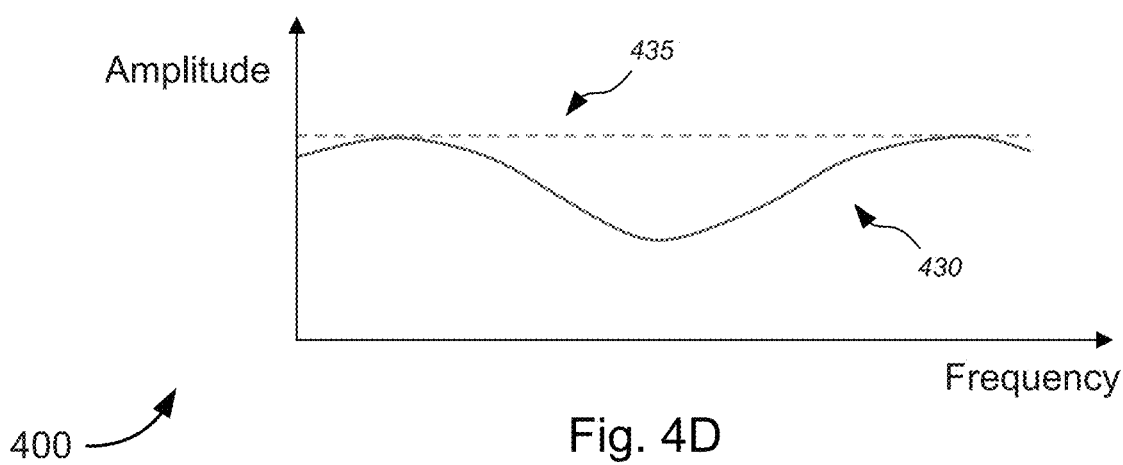

FIGS. 4A-4D (collectively, "FIG. 4") are directed to embodiments 400 directed to lookup tables and implementing frequency response adjustments based on the lookup tables. FIG. 4A is a diagram illustrating an exemplary lookup table 405 that may be used for implementing automatic audio optimization, in accordance with various embodiments. FIGS. 4B-4D are graphical diagrams illustrating various exemplary frequency response adjustments 400 that may be used when implementing automatic audio optimization, in accordance with various embodiments.

Referring to FIG. 4A, lookup table 405 might comprise sections directed to individual content, to content categories, and to default settings. Herein, although generic notations are used for the individual content (e.g., movie 1, TV series 1, etc.), in operation, actual titles and/or other identifiers might be used. Likewise, Param1, Param2, etc. in FIG. 4A serve only to list generic audio parameters for purposes of illustration, but, in operation, the specific audio parameters (and perhaps also the parameter settings themselves, or the like) might be listed. Further, in FIG. 4A, the each ellipsis (" . . . ") serves as a placeholder or the like for purposes of illustration, but, in operation, would be replaced by actual titles, identifiers, characteristics, audio parameters, audio parameter settings, or the like, as appropriate.

Turning to FIG. 4A, under the individual content section, for instance, the lookup table 405 might include, but is not limited to, lists of specific movies (e.g., movie 1, movie 2, etc.), specific television series (e.g., TV series 1, TV series 2, etc.), specific documentaries (e.g., documentary 1, documentary 2, etc.), concerts (e.g., concert 1, concert 2, etc.), and/or the like. For each individual content (denoted in FIG. 4A by only an ellipsis for simplicity of illustration), audio characteristics of the audio portions of the individual content might be listed, either as a whole (or average) or for each particularly audio-distinct portion—for instance, a movie might have a set of audio characteristics for a car chase scene, another different set of audio characteristics for dramatic interaction between two or more characters, yet another different set of audio characteristics for comedic exchanges between two or more characters, etc. The corresponding audio parameters for the specific individual content might be listed either as a single overall (e.g., averaged) set of audio parameter settings or as multiple sets of audio parameter settings for each audio-distinct portion of the individual content (with appropriate timing information for proper adjustment of the audio parameter settings).

As described herein, if the specific individual content is not listed in lookup table 405, the database lookup would shift to the content category to which the specific individual content belongs. Under the content category section, the lookup table 405 might include lists of content categories including, without limitation, news, talk show, documentary, action, drama, comedy, science fiction, fantasy, children's programming, pop music, rock music, country music, classical music, instrumental music, and/or the like. For individual content that fall under either the news category or the talk show category, the audio characteristics might include, e.g., enhancing midrange from a few hundred Hertz to a few kHz, which includes the main frequency range of the human voice. This increases speech intelligibility and reduces background noises outside the enhanced frequency ranges. For individual content that fall under the documentary category, the audio characteristics might include, e.g., a neutral audio setting for playback, realized via a flat or linear frequency response. For individual content that fall under the action category, the audio characteristics might include, e.g., a setting with enhanced bass and treble regions to emphasize the type of audio tracks typically associated with such content. Although not shown (except by ellipsis), the other content categories might include corresponding audio characteristics or the like. The corresponding audio parameters or audio parameter settings may also be listed in lookup table 405 for each content category.

As described herein, if the specific individual content is not listed in lookup table 405, and if the content category is also not listed in lookup table 405, then default settings and audio parameters (and audio parameter settings) would be applied.

According to some embodiments, the lookup table 405 can be stored in several locations: a local lookup table that is stored in the non-volatile memory of an STB or a media player/media presentation device, or the like (if present, this table will be queried first); a remote lookup table that is hosted by an operator or another service provider (this lookup table can essentially be arbitrarily large, as storage limitations are far less critical in this case compared to a locally stored lookup table); or a hybrid local/remote lookup table, which would provide additional flexibility, as an operator can choose to provide a combination of both local and remotely hosted lookup table entries (in this case, the system will first query its local database. The lookup table 405 can also be populated using an Electronic Program Guide ("EPG"), or variant thereof. Such EPGs are typically associated with Live and Video-on-Demand ("VoD") systems. According to some embodiments, in addition to show times, titles, and categories, and/or the like, the EPG could carry additional information needed to configure the automatic audio optimization system. Such an embodiment would enable audio optimization per additional content in addition to audio optimization per content category. If no matching entry is found locally, the STB or media presentation device/player will query the main database at the operator's remote facility). The decision regarding whether and what type of entries to store locally versus remotely may depend on content popularity. For instance, frequently used entries might be stored locally. Depending on demand for popular titles or other content items, an operator may choose to push out entries and pre-populate the local database with items (e.g., information and audio parameter settings associated with media content, or the like) that are anticipated to be accessed in the near future. An advanced system can pre-load database entries depending on previously accessed content. Alternatively, or additionally, pre-populating database entries depending on demographics is possible as well. A more advanced system can dynamically cache entries locally, based on a most frequently used basis. For instance, frequently used entries remain in the local database and rarely accessed items (e.g., information and audio parameter settings associated with media content, or the like) get replaced by more frequently accessed ones. In any case, depending on the design of the entire system and the specific user interface, a user may choose to disable a specific subset of the automatically chosen parameters or may disable the feature entirely, depending on personal preferences.

With reference to FIGS. 4B-4D, examples of frequency response adjustments are depicted in the form of graphical illustrations of amplitude vs. frequency, with FIG. 4B depicting a flat (or linear or neutral) frequency response (for content such as documentaries, or the like), with FIG. 4C depicting a midrange-enhanced frequency response (for content such as news programs, talk show, or the like), with FIG. 4D depicting a bass and treble-enhanced frequency response (for content such as action movies, or the like), and/or the like. In FIGS. 4B-4D, dashed lines 415, 425, and 435 denote the baseline or non-adjusted audio levels or frequency responses, while solid lines 410, 420, and 430 denote the respective adjusted frequency responses.

FIGS. 5A-5D (collectively, "FIG. 5") are flow diagrams illustrating a method 500 for implementing automatic audio optimization, in accordance with various embodiments. Method 500 of FIG. 5A continues onto FIG. 5B following the circular marker denoted, "A."

While the techniques and procedures are depicted and/or described in a certain order for purposes of illustration, it should be appreciated that certain procedures may be reordered and/or omitted within the scope of various embodiments. Moreover, while the method 500 illustrated by FIG. 5 can be implemented by or with (and, in some cases, are described below with respect to) the systems 100, 200, 200', 300, 300', 300", and 300" of FIGS. 1, 2A, 2B, 3A, 3B, 3C, and 3D respectively (or components thereof), such methods may also be implemented using any suitable hardware (or software) implementation. Similarly, while each of the systems 100, 200, 200', 300, 300', 300", and 300" of FIGS. 1, 2A, 2B, 3A, 3B, 3C, and 3D, respectively (or components thereof), can operate according to the method 500 illustrated by FIG. 5 (e.g., by executing instructions embodied on a computer readable medium), the systems 100, 200, 200', 300, 300', 300", and 300" of FIGS. 1, 2A, 2B, 3A, 3B, 3C, and 3D can each also operate according to other modes of operation and/or perform other suitable procedures.

Figure 5A:
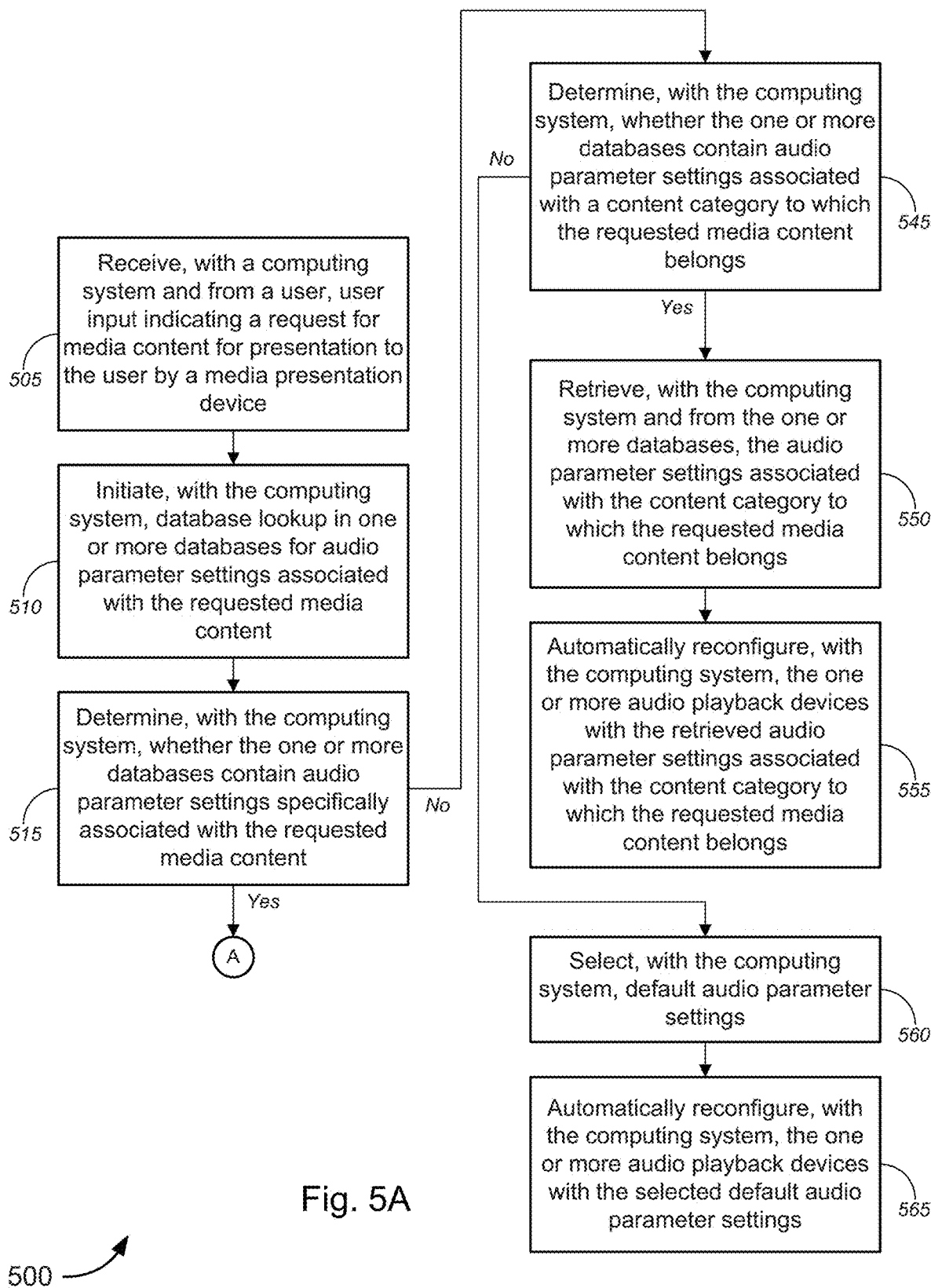

In the non-limiting embodiment of FIG. 5A, method 500, at block 505, might comprise receiving, with a computing system and from a user, user input indicating a request for media content for presentation to the user by a media presentation device. Merely by way of example, in some embodiments, the computing system might include, without limitation, at least one of a set-top box ("STB"), a television, an Internet protocol television ("IPTV"), a media playback device, a media streaming device, a Blu-ray disc ("BD") playback device, a digital video disc ("DVD") playback device, a video on demand ("VoD") platform, a video streaming platform, a digital video recording ("DVR") platform, a gaming console, an audio playback device, a compact disc ("CD") playback device, an audio on demand ("AoD") platform, an audio streaming platform, a smart phone, a tablet computer, a laptop computer, a display device, a desktop computer, a server computer over a network, or a cloud-based computing system, and/or the like.

At block 510, method 500 might comprise initiating, with the computing system, database lookup in one or more databases for audio parameter settings associated with the requested media content. According to some embodiments, the audio parameter settings might include, but are not limited to, at least one of frequency response settings, reverb settings, time domain adjustment settings, settings for phase relationship between audio channels, or subwoofer crossover frequency settings, and/or the like, e.g., to account for multichannel setups or the like. In some instances, the frequency response settings might include, without limitation, one of a linear frequency response, a midrange-enhanced frequency response, a bass-enhanced frequency response, a treble-enhanced frequency response, or a combination base-enhanced and treble-enhanced frequency response, and/or the like. In some cases, the audio parameter settings are listed among a plurality of audio parameter settings in one or more lookup tables in the one or more databases. In some embodiments, the one or more lookup tables might be at least one of refreshed as part of updates for the media presentation device, refreshed using specific pushes to update dedicated content, refreshed on a periodic basis using a scheduling mechanism, refreshed in response to power-up of the media presentation device, or refreshed in response to a user request by the user to refresh, and/or the like.

According to some embodiments, the one or more databases might include, but are not limited to, at least one of one or more network-based databases, one or more distributed computing databases, or one or more local databases, and/or the like. The one or more local databases might be integrated within at least one of a set-top box ("STB"), a television, an Internet protocol television ("IPTV"), a media playback device, a media streaming device, a Blu-ray disc ("BD") playback device, a digital video disc ("DVD") playback device, a video on demand ("VoD") platform, a video streaming platform, a digital video recording ("DVR") platform, a gaming console, an audio playback device, a compact disc ("CD") playback device, an audio on demand ("AoD") platform, an audio streaming platform, a smart phone, a tablet computer, a laptop computer, a display device, or a desktop computer, and/or the like.

Method 500 might further comprise determining, with the computing system, whether the one or more databases contain audio parameter settings specifically associated with the requested media content (block 515). If so, method 500 might proceed to block 520 in FIG. 5B following the circular marker denoted, "A." If not, method 500 might continue to block 545 in FIG. 5A.

Figure 5B:
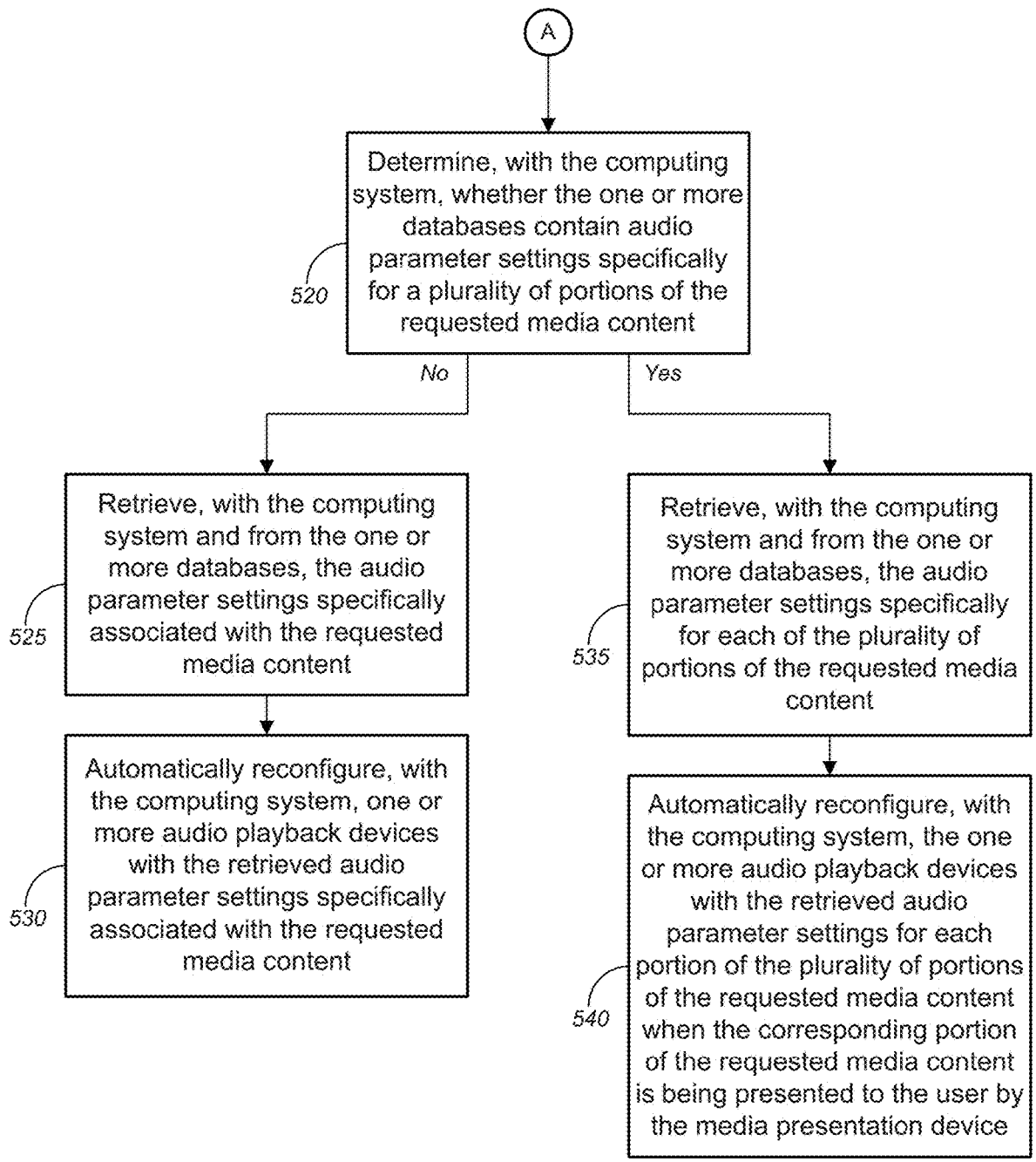

At block 520, in FIG. 5B, method 500 might comprise determining, with the computing system, whether the one or more databases contain audio parameter settings specifically for a plurality of portions of the requested media content (i.e., for media content that has multiple audio-distinct portions, including, but not limited to, dramatic scenes, action scenes, comedic scenes, and/or the like). If not, method 500 might proceed continues to block 525. If so, method 500 might proceed to block 535. At block 525, method 500 might comprise retrieving, with the computing system and from the one or more databases, the audio parameter settings specifically associated with the requested media content (as a whole or overall), and automatically reconfiguring, with the computing system, one or more audio playback devices with the retrieved audio parameter settings specifically associated with the requested media content (block 530). Alternatively, method 500 might comprise retrieving, with the computing system and from the one or more databases, the audio parameter settings specifically for each of the plurality of portions of the requested media content (block 535), and automatically reconfiguring, with the computing system, one or more audio playback devices with the retrieved audio parameter settings specifically for each of the plurality of portions of the requested media content when the corresponding portion of the requested media content is being presented to the user by the media presentation device (block 540). For instance, the lookup table (e.g., table 405 of FIG. 4A, or the like) might list audio characteristics consistent with comedic scenes at elapsed times of 20 minutes, 45 minutes, and 1 hour and 4 minutes, with dramatic scenes at elapsed times of 32 minutes, and 1 hour and 28 minutes, and with action scenes at elapsed times of 5 minutes, 40 minutes, and 1 hour and 15 minutes, or the like. For such a case, the computing system might retrieve, from the one or more databases, the audio parameter settings specifically for each of the comedic scenes, the dramatic scenes, and the actions scenes, and might automatically reconfigure the one or more audio playback devices with the corresponding retrieved audio parameter settings concurrent with the video playback for each corresponding scene.

Turning back to FIG. 5A, based on a determination (at block 515) that the one or more databases do not contain audio parameter settings specifically associated with the requested media content, method 500 might comprise, at block 545, determining, with the computing system, whether the one or more databases contain audio parameter settings associated with a content category to which the requested media content belongs. If so, method 500 might continue to block 550. If not, method 500 might skip to block 560. Based on a determination (at block 545) that the one or more databases contain audio parameter settings associated with a content category to which the requested media content belongs, method 500 might comprise retrieving, with the computing system and from the one or more databases, the audio parameter settings associated with the content category to which the requested media content belongs (block 550), and automatically reconfiguring, with the computing system, the one or more audio playback devices with the retrieved audio parameter settings associated with the content category to which the requested media content belongs (block 555). According to some embodiments, the content category might include, without limitation, at least one of news program, talk show, documentaries, action, drama, comedy, science fiction, fantasy, sports, children's programming, pop music, rock music, country music, techno music, metal music, classical music, or instrumental music, and/or the like.

Alternatively, based on a determination (at blocks 515 and 545) that the one or more databases do not contain audio parameter settings specifically associated with the requested media content and do not contain audio parameter settings associated with a content category to which the requested media content belongs, method 500 might comprise selecting, with the computing system, default audio parameter settings (block 560), and automatically reconfiguring, with the computing system, the one or more audio playback devices with the selected default audio parameter settings (block 565).

With reference to FIG. 5C, automatically reconfiguring, with the computing system, one or more audio playback devices with the retrieved audio parameter settings (corresponding to the processes at any or each of blocks 530, 540, 555, and 565, or the like) might comprise extracting, with the computing system, one or more audio portions of the requested media content (block 570), adjusting, with the computing system, the retrieved audio parameter settings for each of the one or more audio portions of the requested media content (block 575), and inserting, with the computing system, the resultant one or more audio portions of the requested media content (block 580). According to some embodiments, the one or more audio playback devices might be either reconfigured with the retrieved audio parameter settings prior to presentation of the requested media content by the media presentation device, or reconfigured with the retrieved audio parameter settings concurrent with presentation of the requested media content by the media presentation device. Merely by way of example, the one or more audio playback devices might include, but are not limited to, at least one of one or more external speakers, one or more headphones, one or more earbuds, or one or more integrated speakers, and/or the like. The one or more integrated speakers might include speakers that are integrated in at least one of a television, an Internet protocol television ("IPTV"), a media playback device, a media streaming device, a video on demand ("VoD") platform, a video streaming platform, a gaming console, an audio playback device, a compact disc ("CD") playback device, an audio on demand ("AoD") platform, an audio streaming platform, a smart phone, a tablet computer, a laptop computer, a display device, or a desktop computer, and/or the like.

In some embodiments, referring to FIG. 5D, adjusting the retrieved audio parameter settings for each of the one or more audio portions of the requested media content (at block 575) might comprise identifying, with the computing system, the one or more audio playback devices (block 585), determining, with the computing system, audio characteristics of the identified one or more audio playback devices (block 590), and adjusting, with the computing system, the retrieved audio parameter settings for each of the one or more audio portions of the requested media content that take into account the determined audio characteristics of the identified one or more audio playback devices (block 595).

Exemplary System and Hardware Implementation

Figure 6:
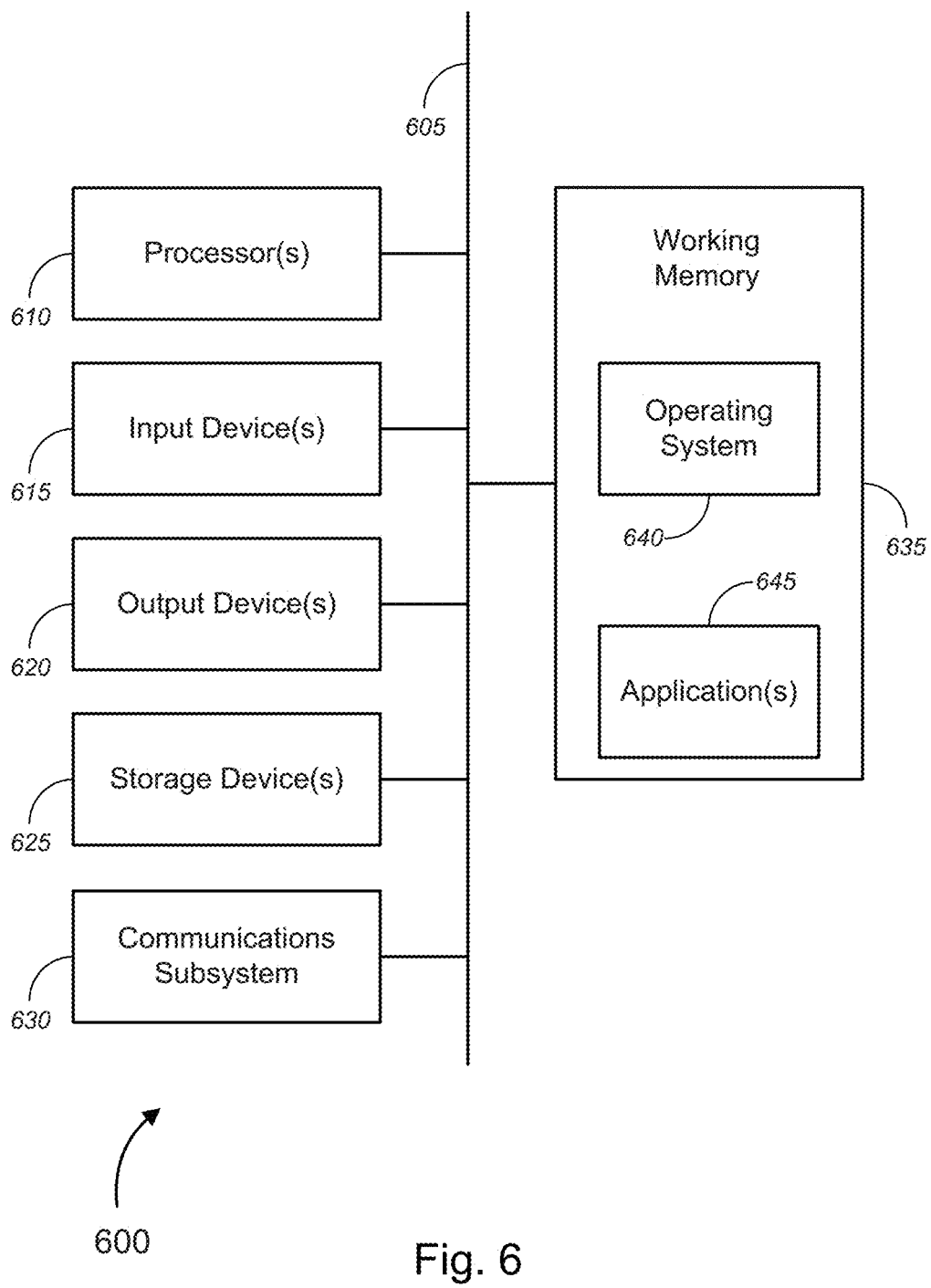
FIG. 6 is a block diagram illustrating an exemplary computer or system hardware architecture, in accordance with various embodiments.

FIG. 6 is a block diagram illustrating an exemplary computer or system hardware architecture, in accordance with various embodiments. FIG. 6 provides a schematic illustration of one embodiment of a computer system 600 of the service provider system hardware that can perform the methods provided by various other embodiments, as described herein, and/or can perform the functions of computer or hardware system (i.e., computing systems 105*a*, 105*b*, and 205, media presentation devices 115, 225, and 305, user devices 120, 255, and 310, audio playback devices 125*a*-125*n*, 285, 290, 315, and 315', audio/video ("A/V") equipment 320, media content sources (or servers) 135, etc.), as described above. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer or hardware system 600—which might represent an embodiment of the computer or hardware system (i.e., computing systems 105a, 105b, and 205, media presentation devices 115, 225, and 305, user devices 120, 255, and 310, audio playback devices 125a-125n, 285, 290, 315, and 315', audio/video ("A/V") equipment 320, media content sources (or servers) 135, etc.), described above with respect to FIGS. 1-5—is shown comprising hardware elements that can be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, and/or the like); one or more input devices 615, which can include, without limitation, a mouse, a keyboard and/or the like; and one or more output devices 620, which can include, without limitation, a display device, a printer, and/or the like.

The computer or hardware system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 600 might also include a communications subsystem 630, which can include, without limitation, a modem, a network card (wireless or wired), an infra-red communication device, a wireless communication device and/or chipset (such as a Bluetooth™ device, a WiFi device (IEEE 802.11), a WiMax device (IEEE 802.16), a WWAN device, cellular communication facilities, etc.), and/or the like. The communications subsystem 630 may permit data to be exchanged with a network (such as the network described below, to name one example), with other computer or hardware systems, and/or with any other devices described herein. In many embodiments, the computer or hardware system 600 will further comprise a working memory 635, which can include a RAM or ROM device, as described above.

The computer or hardware system 600 also may comprise software elements, shown as being currently located within the working memory 635, including an operating system 640, device drivers, executable libraries, and/or other code, such as one or more application programs 645, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 600 and/or might take the form of source and/or installable code, which, upon compilation and/or installation on the computer or hardware system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 600) to perform methods in accordance with various embodiments of the invention. According to a set of embodiments, some or all of the procedures of such methods are performed by the computer or hardware system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

Figure 7:
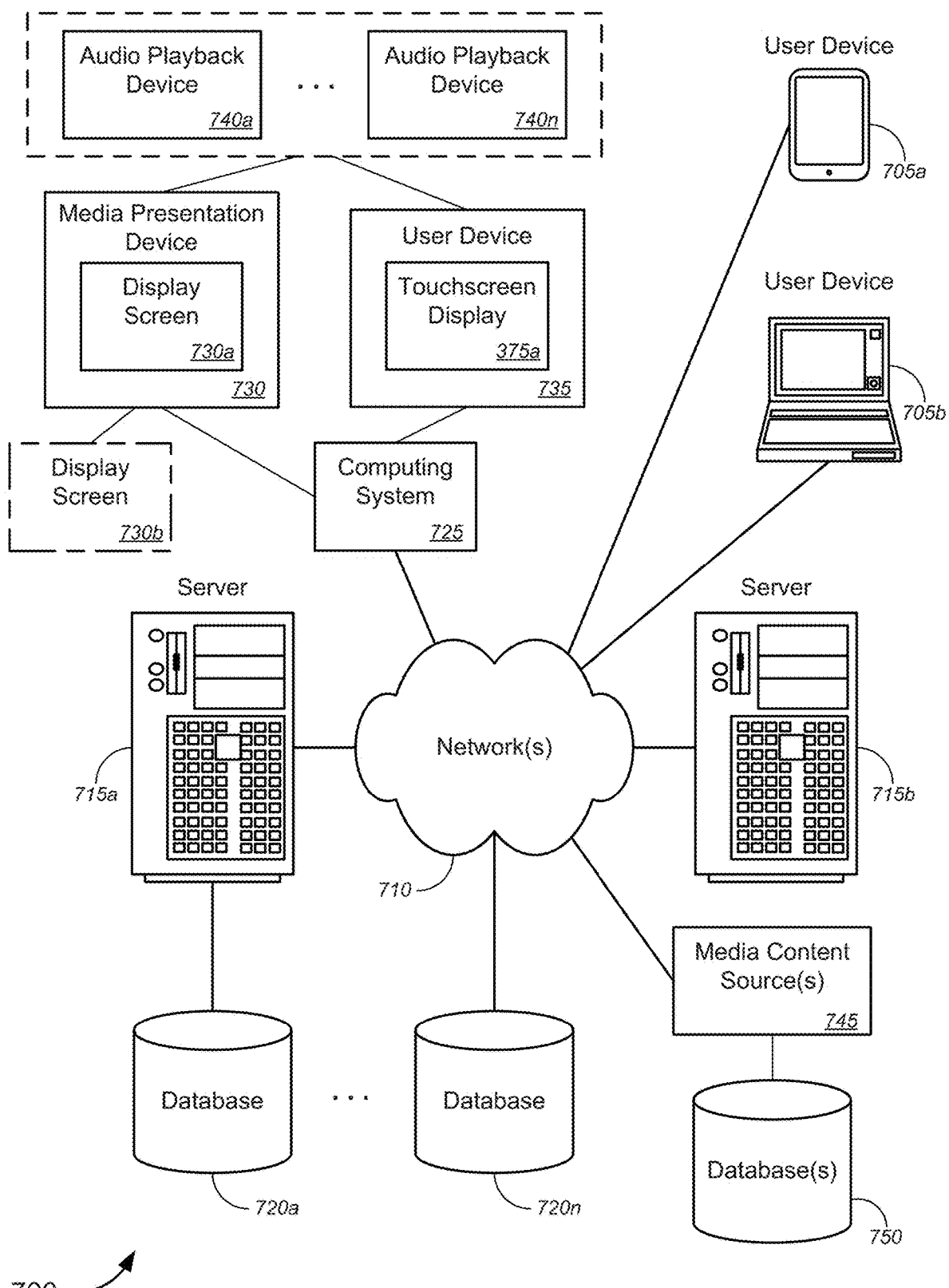
FIG. 7 is a block diagram illustrating a networked system of computers, computing systems, or system hardware architecture, which can be used in accordance with various embodiments.

As noted above, a set of embodiments comprises methods and systems for implementing media content streaming or playback, and, more particularly, to methods, systems, and apparatuses for implementing automatic audio optimization (in some cases, for streaming services, or the like). FIG. 7 illustrates a schematic diagram of a system 700 that can be used in accordance with one set of embodiments. The system 700 can include one or more user computers, user devices, or customer devices 705. A user computer, user device, or customer device 705 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 705 can also have any of a variety of applications, including one or more applications configured to perform methods provided by various embodiments (as described above, for example), as well as one or more office applications, database client and/or server applications, and/or web browser applications. Alternatively, a user computer, user device, or customer device 705 can be any other electronic device, such as a thin-client computer, Internet-enabled mobile telephone, and/or personal digital assistant, capable of communicating via a network (e.g., the network(s) 710 described below) and/or of displaying and navigating web pages or other types of electronic documents. Although the exemplary system 700 is shown with two user computers, user devices, or customer devices 705, any number of user computers, user devices, or customer devices can be supported.

Certain embodiments operate in a networked environment, which can include a network(s) 710. The network(s) 710 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 710 (similar to network(s) 145 FIG. 1, or the like) can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 715. Each of the server computers 715 may be configured with an operating system, including, without limitation, any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, a web server, a cloud computing device(s), or the like, as described above. The data server might include (or be in communication with) a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 705 and/or another server 715. In some embodiments, an application server can perform one or more of the processes for implementing media content streaming or playback, and, more particularly, to methods, systems, and apparatuses for implementing automatic audio optimization (in some cases, for streaming services, or the like), as described in detail above. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases, a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer, user device, or customer device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720a-720n (collectively, "databases 720"). The location of each of the databases 720 is discretionary: merely by way of example, a database 720a might reside on a storage medium local to (and/or resident in) a server 715a (and/or a user computer, user device, or customer device 705). Alternatively, a database 720n can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720 can be a relational database, such as an Oracle database, that is adapted to store, update, and retrieve data in response to SQL-formatted commands. The database might be controlled and/or maintained by a database server, as described above, for example.

According to some embodiments, system 700 might further comprise a computing system 725 (similar to computing systems 105a, 105b, and 205 of FIGS. 1 and 2A, or the like), one or more media presentation devices 730 each with display screen 730a (similar to media presentation devices 115, 225, and 305 of FIGS. 1, 2A, 2B, and 3A-3D, or the like), an external display screen 730b (similar to display screens 115b and 245b of FIGS. 1, 2A, and 2B, or the like), one or more user devices 735 each with touchscreen display 735a (similar to user devices 120, 255, and 310 of FIGS. 1, 2A, 2B, and 3A-3D, or the like), one or more audio playback devices 740a-740n (similar to audio playback devices 125a-125n, 285, 290, 315, and 315' of FIGS. 1, 2A, 2B, and 3B-3D, or the like), one or more media (e.g., video or audio) content sources 745 and corresponding database(s) 750 (similar to media (e.g., audio or video) content sources (or servers) 135 and corresponding databases 140 of FIG. 1, or the like), and/or the like. In some embodiments, the computing system might comprise a media device that is communicatively coupled to a playback device(s) (i.e., one or more of media presentation device(s) 730, the user device(s) 705 or 735, and/or audio playback device(s) 740a-740n, or the like). In some cases, the media device might comprise one of a set-top box ("STB"), a media player, a gaming console, a server computer, a desktop computer, or a laptop computer, and/or the like. The media player might comprise one of a digital versatile disc or digital video disc ("DVD") player, a Blu-ray disc ("BD") player, a streaming video player, a streaming music player, or a streaming game player, and/or the like, while the playback device might comprise at least one of one or more monitors, one or more television sets, or one or more speakers, and/or the like.

In operation, the computing system 725 (and/or the media presentation device 730) might receive user input from a user indicating a request for media content for presentation to the user by the media presentation device 730 or the like. The computing system 725 (and/or media presentation device 730) might initiate or perform database lookup in one or more databases 720a-720n and/or 750 for audio parameter settings associated with the requested media content. According to some embodiments, the audio parameter settings might include, but are not limited to, at least one of frequency response settings, reverb settings, time domain adjustment settings, settings for phase relationship between audio channels, or subwoofer cross-over frequency settings, and/or the like, e.g., to account for multichannel setups or the like. In some instances, the frequency response settings might include, without limitation, one of a linear frequency response, a midrange-enhanced frequency response, a bass-enhanced frequency response, a treble-enhanced frequency response, or a combination base-enhanced and treble-enhanced frequency response, and/or the like. In some cases, the audio parameter settings are listed among a plurality of audio parameter settings in one or more lookup tables in the one or more databases. In some embodiments, the one or more lookup tables might be at least one of refreshed as part of updates for the media presentation device 730, refreshed using specific pushes to update dedicated content, refreshed on a periodic basis using a scheduling mechanism, refreshed in response to power-up of the media presentation device, or refreshed in response to a user request by the user to refresh, and/or the like.

The computing system 725 (and/or media presentation device 730) might determine whether the one or more databases contain audio parameter settings specifically associated with the requested media content. Based on a determination that the one or more databases contain audio parameter settings specifically associated with the requested media content, the computing system 725 (and/or media presentation device 730) might determine whether the one or more databases contain audio parameter settings specifically for a plurality of portions of the requested media content (i.e., for media content that has multiple audio-distinct portions, including, but not limited to, dramatic scenes, action scenes, comedic scenes, and/or the like). If so, the computing system 725 (and/or media presentation device 730) might retrieve, from the one or more databases, the audio parameter settings specifically for each of the plurality of portions of the requested media content, and automatically reconfigure one or more audio playback devices 740a-740n with the retrieved audio parameter settings specifically for each of the plurality of portions of the requested media content when the corresponding portion of the requested media content is being presented to the user by the media presentation device. If not, the computing system 725 (and/or media presentation device 730) might retrieve, from the one or more databases, the audio parameter settings specifically associated with the requested media content (as a whole or overall), and automatically reconfigure the one or more audio playback devices 740a-740n with the retrieved audio parameter settings specifically associated with the requested media content.

Based on a determination that the one or more databases do not contain audio parameter settings specifically associated with the requested media content, the computing system 725 (and/or media presentation device 730) might determine whether the one or more databases contain audio parameter settings associated with a content category to which the requested media content belongs. Based on a determination that the one or more databases contain audio parameter settings associated with a content category to which the requested media content belongs, the computing system 725 (and/or media presentation device 730) might retrieve, from the one or more databases, the audio parameter settings associated with the content category to which the requested media content belongs, and automatically reconfigure the one or more audio playback devices with the retrieved audio parameter settings associated with the content category to which the requested media content belongs. According to some embodiments, the content category might include, without limitation, at least one of news program, talk show, documentaries, action, drama, comedy, science fiction, fantasy, sports, children's programming, pop music, rock music, country music, techno music, metal music, classical music, or instrumental music, and/or the like.

Based on a determination that the one or more databases do not contain audio parameter settings specifically associated with the requested media content and do not contain audio parameter settings associated with a content category to which the requested media content belongs, the computing system 725 (and/or media presentation device 730) might select default audio parameter settings, and automatically reconfigure the one or more audio playback devices with the selected default audio parameter settings.

Merely by way of example, in some embodiments, automatically reconfiguring one or more audio playback devices 740a-740n with the retrieved audio parameter settings might comprise the computing system 725 (and/or media presentation device 730) extracting one or more audio portions of the requested media content, adjusting the retrieved audio parameter settings for each of the one or more audio portions of the requested media content, and inserting the resultant one or more audio portions of the requested media content. According to some embodiments, the one or more audio playback devices 740a-740n might be either reconfigured with the retrieved audio parameter settings prior to presentation of the requested media content by the media presentation device 730, or reconfigured with the retrieved audio parameter settings concurrent with presentation of the requested media content by the media presentation device 730. In some embodiments, adjusting the retrieved audio parameter settings for each of the one or more audio portions of the requested media content might comprise the computing system 725 (and/or media presentation device 730) identifying the one or more audio playback devices, determining audio characteristics of the identified one or more audio playback devices 740a-740n, and adjusting the retrieved audio parameter settings for each of the one or more audio portions of the requested media content that take into account the determined audio characteristics of the identified one or more audio playback devices 740a-740n.

These and other functions of the system 700 (and its components) are described in greater detail above with respect to FIGS. 1-5.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

receiving, with a computing system and from a user, user input indicating a request for media content for presentation to the user by a media presentation device;

initiating, with the computing system, database lookup in one or more databases for audio parameter settings associated with the requested media content;

determining, with the computing system, whether the one or more databases contain audio parameter settings specifically associated with the requested media content;

based on a determination that the one or more databases contain audio parameter settings specifically associated with the requested media content, retrieving, with the computing system and from the one or more databases, the audio parameter settings specifically associated with the requested media content, and automatically reconfiguring, with the computing system, one or more audio playback devices with the retrieved audio parameter settings specifically associated with the requested media content;

based on a determination that the one or more databases do not contain audio parameter settings specifically associated with the requested media content, determining, with the computing system, whether the one or more databases contain audio parameter settings associated with a content category to which the requested media content belongs; and based on a determination that the one or more databases contain audio parameter settings associated with a content category to which the requested media content belongs, retrieving, with the computing system and from the one or more databases, the audio parameter settings associated with the content category to which the requested media content belongs, and automatically reconfiguring, with the computing system, the one or more audio playback devices with the retrieved audio parameter settings associated with the content category to which the requested media content belongs.

2. The method of claim 1, further comprising:

based on a determination that the one or more databases do not contain audio parameter settings specifically associated with the requested media content and do not contain audio parameter settings associated with a content category to which the requested media content belongs, selecting, with the computing system, default audio parameter settings, and automatically reconfiguring, with the computing system, the one or more audio playback devices with the selected default audio parameter settings.

3. The method of claim 1, wherein the content category comprises at least one of news program, talk show, documentaries, action, drama, comedy, science fiction, fantasy, sports, children's programming, pop music, rock music, country music, techno music, metal music, classical music, or instrumental music.

4. The method of claim 1, wherein determining whether the one or more databases contain audio parameter settings specifically associated with the requested media content comprises determining, with the computing system, whether the one or more databases contain audio parameter settings specifically for a plurality of portions of the requested media content, wherein retrieving the audio parameter settings specifically associated with the requested media content and automatically reconfiguring the one or more audio playback devices with the retrieved audio parameter settings comprise:

based on a determination that the one or more databases contain audio parameter settings specifically for a plurality of portions of the requested media content, retrieving, with the computing system and from the one or more databases, the audio parameter settings specifically for each of the plurality of portions of the requested media content, and automatically reconfiguring, with the computing system, the one or more audio playback devices with the retrieved audio parameter settings for each portion of the plurality of portions of the requested media content when the corresponding portion of the requested media content is being presented to the user by the media presentation device.

5. The method of claim 1, wherein the one or more audio playback devices are one of reconfigured with the retrieved audio parameter settings prior to presentation of the requested media content by the media presentation device, or reconfigured with the retrieved audio parameter settings concurrent with presentation of the requested media content by the media presentation device.

6. The method of claim 1, wherein the one or more audio playback devices comprise at least one of one or more external speakers, one or more headphones, one or more earbuds, or one or more integrated speakers, wherein the one or more integrated speakers comprise speakers that are integrated in at least one of a television, an Internet protocol television ("IPTV"), a media playback device, a media streaming device, a video on demand ("VoD") platform, a video streaming platform, a gaming console, an audio playback device, a compact disc ("CD") playback device, an audio on demand ("AoD") platform, an audio streaming platform, a smart phone, a tablet computer, a laptop computer, a display device, or a desktop computer.

7. The method of claim 1, wherein the computing system comprises at least one of a set-top box ("STB"), a television, an Internet protocol television ("IPTV"), a media playback device, a media streaming device, a Blu-ray disc ("BD") playback device, a digital video disc ("DVD") playback device, a video on demand ("VoD") platform, a video streaming platform, a digital video recording ("DVR") platform, a gaming console, an audio playback device, a compact disc ("CD") playback device, an audio on demand ("AoD") platform, an audio streaming platform, a smart phone, a tablet computer, a laptop computer, a display device, a desktop computer, a server computer over a network, or a cloud-based computing system.

8. The method of claim 1, wherein the audio parameter settings comprise at least one of frequency response settings, reverb settings, time domain adjustment settings, settings for phase relationship between audio channels, or subwoofer cross-over frequency settings.

9. The method of claim 8, wherein the frequency response settings comprise one of a linear frequency response, a midrange-enhanced frequency response, a bass-enhanced frequency response, a treble-enhanced frequency response, or a combination base-enhanced and treble-enhanced frequency response.

10. The method of claim 1, wherein the audio parameter settings are listed among a plurality of audio parameter settings in one or more lookup tables in the one or more databases.

11. The method of claim 10, wherein the one or more lookup tables are at least one of refreshed as part of updates for the media presentation device, refreshed using specific pushes to update dedicated content, refreshed on a periodic basis using a scheduling mechanism, refreshed in response to power-up of the media presentation device, or refreshed in response to a user request by the user to refresh.

12. The method of claim 1, wherein the one or more databases comprise at least one of one or more network-based databases, one or more distributed computing databases, or one or more local databases, wherein the one or more local databases are integrated within at least one of a set-top box ("STB"), a television, an Internet protocol television ("IPTV"), a media playback device, a media streaming device, a Blu-ray disc ("BD") playback device, a digital video disc ("DVD") playback device, a video on demand ("VoD") platform, a video streaming platform, a digital video recording ("DVR") platform, a gaming console, an audio playback device, a compact disc ("CD") playback device, an audio on demand ("AoD") platform, an audio streaming platform, a smart phone, a tablet computer, a laptop computer, a display device, or a desktop computer.

13. The method of claim 1, wherein automatically reconfiguring the one or more audio playback devices with the retrieved audio parameter settings comprises:

extracting, with the computing system, one or more audio portions of the requested media content;

adjusting, with the computing system, the retrieved audio parameter settings for each of the one or more audio portions of the requested media content; and inserting, with the computing system, the resultant one or more audio portions of the requested media content.

14. The method of claim 13, wherein adjusting the retrieved audio parameter settings for each of the one or more audio portions of the requested media content comprises:

identifying, with the computing system, the one or more audio playback devices;

determining, with the computing system, audio characteristics of the identified one or more audio playback devices; and adjusting, with the computing system, the retrieved audio parameter settings for each of the one or more audio portions of the requested media content that take into account the determined audio characteristics of the identified one or more audio playback devices.

15. An apparatus, comprising:

at least one processor; and a non-transitory computer readable medium communicatively coupled to the at least one processor, the non-transitory computer readable medium having stored thereon computer software comprising a set of instructions that, when executed by the at least one processor, causes the apparatus to:

receive, from a user, user input indicating a request for media content for presentation to the user by a media presentation device;

initiate database lookup in one or more databases for audio parameter settings associated with the requested media content;

determine whether the one or more databases contain audio parameter settings specifically associated with the requested media content;

based on a determination that the one or more databases contain audio parameter settings specifically associated with the requested media content, retrieve, from the one or more databases, the audio parameter settings specifically associated with the requested media content, and automatically reconfigure one or more audio playback devices with the retrieved audio parameter settings specifically associated with the requested media content;

based on a determination that the one or more databases do not contain audio parameter settings specifically associated with the requested media content, determine whether the one or more databases contain audio parameter settings associated with a content category to which the requested media content belongs; and based on a determination that the one or more databases contain audio parameter settings associated with a content category to which the requested media content belongs, retrieve, from the one or more databases, the audio parameter settings associated with the content category to which the requested media content belongs, and automatically reconfigure the one or more audio playback devices with the retrieved audio parameter settings associated with the content category to which the requested media content belongs.

16. The apparatus of claim 15, wherein the set of instructions, when executed by the at least one processor, further causes the apparatus to:

based on a determination that the one or more databases do not contain audio parameter settings specifically associated with the requested media content and do not contain audio parameter settings associated with a content category to which the requested media content belongs, select default audio parameter settings, and automatically reconfigure the one or more audio playback devices with the selected default audio parameter settings.

17. The apparatus of claim 15, wherein the apparatus comprises at least one of a set-top box ("STB"), a television, an Internet protocol television ("IPTV"), a media playback device, a media streaming device, a Blu-ray disc ("BD") playback device, a digital video disc ("DVD") playback device, a video on demand ("VoD") platform, a video streaming platform, a digital video recording ("DVR") platform, a gaming console, an audio playback device, a compact disc ("CD") playback device, an audio on demand ("AoD") platform, an audio streaming platform, a smart phone, a tablet computer, a laptop computer, a display device, a desktop computer, a server computer over a network, or a cloud-based computing system.

18. A system, comprising:

a computing system, comprising:

at least one first processor; and a first non-transitory computer readable medium communicatively coupled to the at least one first processor, the first non-transitory computer readable medium having stored thereon computer software comprising a first set of instructions that, when executed by the at least one first processor, causes the computing system to:

receive, from a user, user input indicating a request for media content for presentation to the user;

initiate database lookup in one or more databases for audio parameter settings associated with the requested media content;

determine whether the one or more databases contain audio parameter settings specifically associated with the requested media content;

based on a determination that the one or more databases contain audio parameter settings specifically associated with the requested media content, retrieve, from the one or more databases, the audio parameter settings specifically associated with the requested media content, and automatically reconfigure one or more audio playback devices with the retrieved audio parameter settings specifically associated with the requested media content;

based on a determination that the one or more databases do not contain audio parameter settings specifically associated with the requested media content, determine whether the one or more databases contain audio parameter settings associated with a content category to which the requested media content belongs; and based on a determination that the one or more databases contain audio parameter settings associated with a content category to which the requested media content belongs, retrieve, from the one or more databases, the audio parameter settings associated with the content category to which the requested media content belongs, and automatically reconfigure the one or more audio playback devices with the retrieved audio parameter settings associated with the content category to which the requested media content belongs;
send the requested media content and the audio parameter settings to a media presentation system;
the media presentation system, comprising:
at least one second processor; and
a second non-transitory computer readable medium communicatively coupled to the at least one second processor, the second non-transitory computer readable medium having stored thereon computer software comprising a second set of instructions that, when executed by the at least one second processor, causes the media presentation system to:
receive the requested media content and the audio parameter settings;
present the requested media content to the user; and
send audio content corresponding to the requested media content and the audio parameter settings to the one or more audio playback devices; and
the one or more audio playback devices, each comprising:
at least one third processor; and
a third non-transitory computer readable medium communicatively coupled to the at least one third processor, the third non-transitory computer readable medium having stored thereon computer software comprising a third set of instructions that, when executed by the at least one third processor, causes each audio playback device to:
receive the audio content corresponding to the requested media content and the audio parameter settings; and
present the audio content corresponding to the requested media content, as adjusted by the audio parameter settings.

19. The system of claim 18, wherein the computing system and the media presentation device are embodied in the same device.

20. The system of claim 18, wherein the media presentation device comprises at least one of the one or more audio playback devices.

21. The system of claim 18, wherein the computing system comprises at least one of a set-top box ("STB"), a television, an Internet protocol television ("IPTV"), a media playback device, a media streaming device, a Blu-ray disc ("BD") playback device, a digital video disc ("DVD") playback device, a video on demand ("VoD") platform, a video streaming platform, a digital video recording ("DVR") platform, a gaming console, an audio playback device, a compact disc ("CD") playback device, an audio on demand ("AoD") platform, an audio streaming platform, a smart phone, a tablet computer, a laptop computer, a display device, a desktop computer, a server computer over a network, or a cloud-based computing system.

22. The system of claim 18, wherein the one or more audio playback devices comprise at least one of one or more external speakers, one or more headphones, one or more earbuds, or one or more integrated speakers, wherein the one or more integrated speakers comprise speakers that are integrated in at least one of a television, an Internet protocol television ("IPTV"), a media playback device, a media streaming device, a video on demand ("VoD") platform, a video streaming platform, a gaming console, an audio playback device, a compact disc ("CD") playback device, an audio on demand ("AoD") platform, an audio streaming platform, a smart phone, a tablet computer, a laptop computer, a display device, or a desktop computer.

\* \* \* \* \*